US012625118B2

(12) United States Patent (10) Patent No.: US 12,625,118 B2
Shinholt (45) Date of Patent: May 12, 2026

(54) IDLE-TRIGGERED DIAGNOSTICS FOR SCIENTIFIC INSTRUMENTS

(71) Applicant: Thermo Finnigan LLC, San Jose, CA (US)

(72) Inventor: Deven Lee Shinholt, Leander, TX (US)

(73) Assignee: Thermo Finnigan LLC, San Jose, CA (US)

( * ) Notice: Subject to any disclaimer, the term of this patent is extended or adjusted under 35 U.S.C. 154(b) by 325 days.

(21) Appl. No.: 18/452,294

(22) Filed: Aug. 18, 2023

(65) Prior Publication Data

US 2025/0060345 A1 Feb. 20, 2025

(51) Int. Cl.
*G01N 30/86* (2006.01)
*G01N 27/623* (2021.01)
*H01J 49/00* (2006.01)

(52) U.S. Cl.
CPC ....... *G01N 30/8665* (2013.01); *G01N 27/623* (2021.01); *H01J 49/0036* (2013.01)

(58) Field of Classification Search
CPC ............. G01N 30/8665; G01N 27/623; G01N 2030/8809; G01N 30/72; G01N 30/86; G01N 30/02; G01N 30/8696; H01J 49/0036; H01J 49/0027
USPC ................................................ 250/281, 282
See application file for complete search history.

(56) References Cited

U.S. PATENT DOCUMENTS

| | | | |
|---|---|---|---|
| 9,293,312 B2 | 3/2016 | Remes et al. | |
| 10,521,805 B2 | 12/2019 | Yurach et al. | |
| 10,591,452 B2 | 3/2020 | Saito | |
| 11,275,065 B2 | 3/2022 | Kobold et al. | |
| 11,282,685 B2 * | 3/2022 | Quarmby ............ | H01J 49/0027 |
| 11,476,103 B2 | 10/2022 | Wamsley et al. | |
| 2021/0217605 A1 | 7/2021 | Ueda | |
| 2022/0026402 A1 | 1/2022 | Komori | |

FOREIGN PATENT DOCUMENTS

| | | |
|---|---|---|
| GB | 2600525 A | 5/2022 |
| WO | 2020/129137 A1 | 6/2020 |
| WO | 2022107079 A1 | 5/2022 |
| WO | 2022131379 A | 6/2022 |

OTHER PUBLICATIONS

Agilent Technologies | "Helium Conservation Module." Flyer, published in the US Apr. 2022, 2 pages.

* cited by examiner

*Primary Examiner* — Michael Maskell

(57) ABSTRACT

Systems or techniques are provided for facilitating idle-triggered diagnostics for scientific instruments. In various embodiments, a scientific instrument can comprise a mass spectrometer coupled to a chromatograph. In various aspects, the scientific instrument can determine, via a temperature sensor of the chromatograph or via a clock of the mass spectrometer, whether the scientific instrument is in an idle-time period. In various instances, the scientific instrument can, in response to a determination that the scientific instrument is in the idle-time period, apply one or more electronic control signals to the mass spectrometer or to the chromatograph, measure one or more resultant ion spectra via an ion detector of the mass spectrometer, and determine whether the mass spectrometer or the chromatograph is operating correctly based on the one or more resultant ion spectra.

20 Claims, 19 Drawing Sheets

SCIENTIFIC INSTRUMENT MODULE
102

FIRST (IDLE-TIME DETERMINATION) LOGIC
104

SECOND (DIAGNOSTIC CHECKING) LOGIC
106

SCIENTIFIC INSTRUMENT MODULE
102

FIRST (IDLE-TIME
DETERMINATION) LOGIC
104

SECOND (DIAGNOSTIC
CHECKING) LOGIC
106

PERFORM FIRST OPERATIONS DETERMINING
WHETHER A SCIENTIFIC INSTRUMENT IS
CURRENTLY IN AN IDLE-TIME PERIOD

— 202

IN RESPONSE TO OR OTHERWISE BASED ON
DETERMINING THAT THE SCIENTIFIC
INSTRUMENT IS CURRENTLY IN THE IDLE-TIME
PERIOD, PERFORM SECOND OPERATIONS
EXECUTING A DIAGNOSTIC CHECK OF THE
SCIENTIFIC INSTRUMENT

— 204

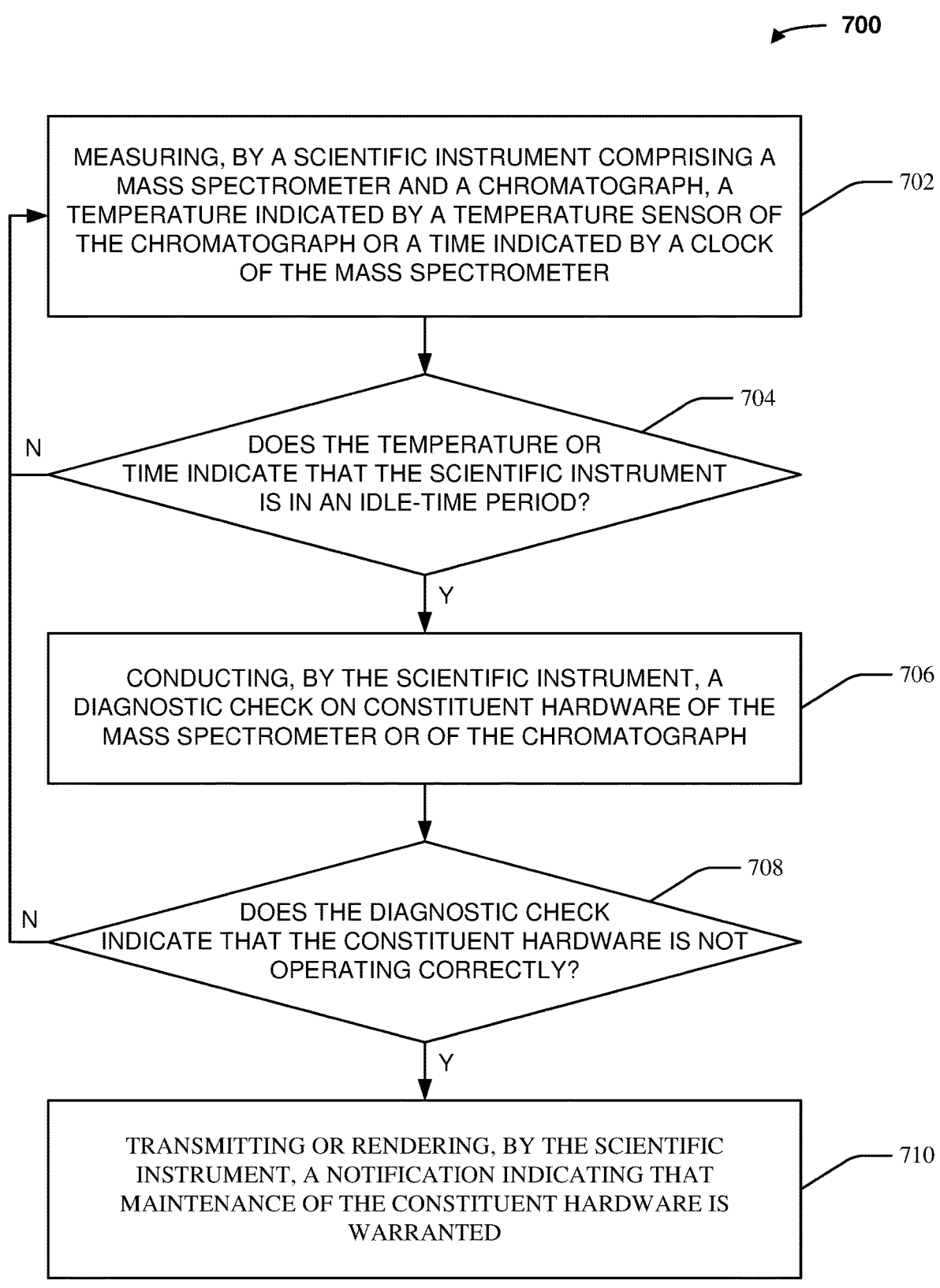

700

MEASURING, BY A SCIENTIFIC INSTRUMENT COMPRISING A MASS SPECTROMETER AND A CHROMATOGRAPH, A TEMPERATURE INDICATED BY A TEMPERATURE SENSOR OF THE CHROMATOGRAPH OR A TIME INDICATED BY A CLOCK OF THE MASS SPECTROMETER — 702

DOES THE TEMPERATURE OR TIME INDICATE THAT THE SCIENTIFIC INSTRUMENT IS IN AN IDLE-TIME PERIOD? — 704

N

Y

CONDUCTING, BY THE SCIENTIFIC INSTRUMENT, A DIAGNOSTIC CHECK ON CONSTITUENT HARDWARE OF THE MASS SPECTROMETER OR OF THE CHROMATOGRAPH — 706

DOES THE DIAGNOSTIC CHECK INDICATE THAT THE CONSTITUENT HARDWARE IS NOT OPERATING CORRECTLY? — 708

N

Y

TRANSMITTING OR RENDERING, BY THE SCIENTIFIC INSTRUMENT, A NOTIFICATION INDICATING THAT MAINTENANCE OF THE CONSTITUENT HARDWARE IS WARRANTED — 710

FIG. 7

SCIENTIFIC INSTRUMENT 302

CHROMATOGRAPH 304

CONSTITUENT HARDWARE 322

TEMPERATURE SENSOR 404

MASS SPECTROMETER 306

CONSTITUENT HARDWARE 324

CLOCK 406

DIAGNOSTIC SYSTEM 308

CHECK COMPONENT 318

DIAGNOSTIC CHECK 502

TUNING OPERATION 802

ACCESS COMPONENT 314

MEMORY 312

RESULT COMPONENT 320

DETERMINATION COMPONENT 316

IDLE-TIME PERIOD 402

PROCESSOR 310

900

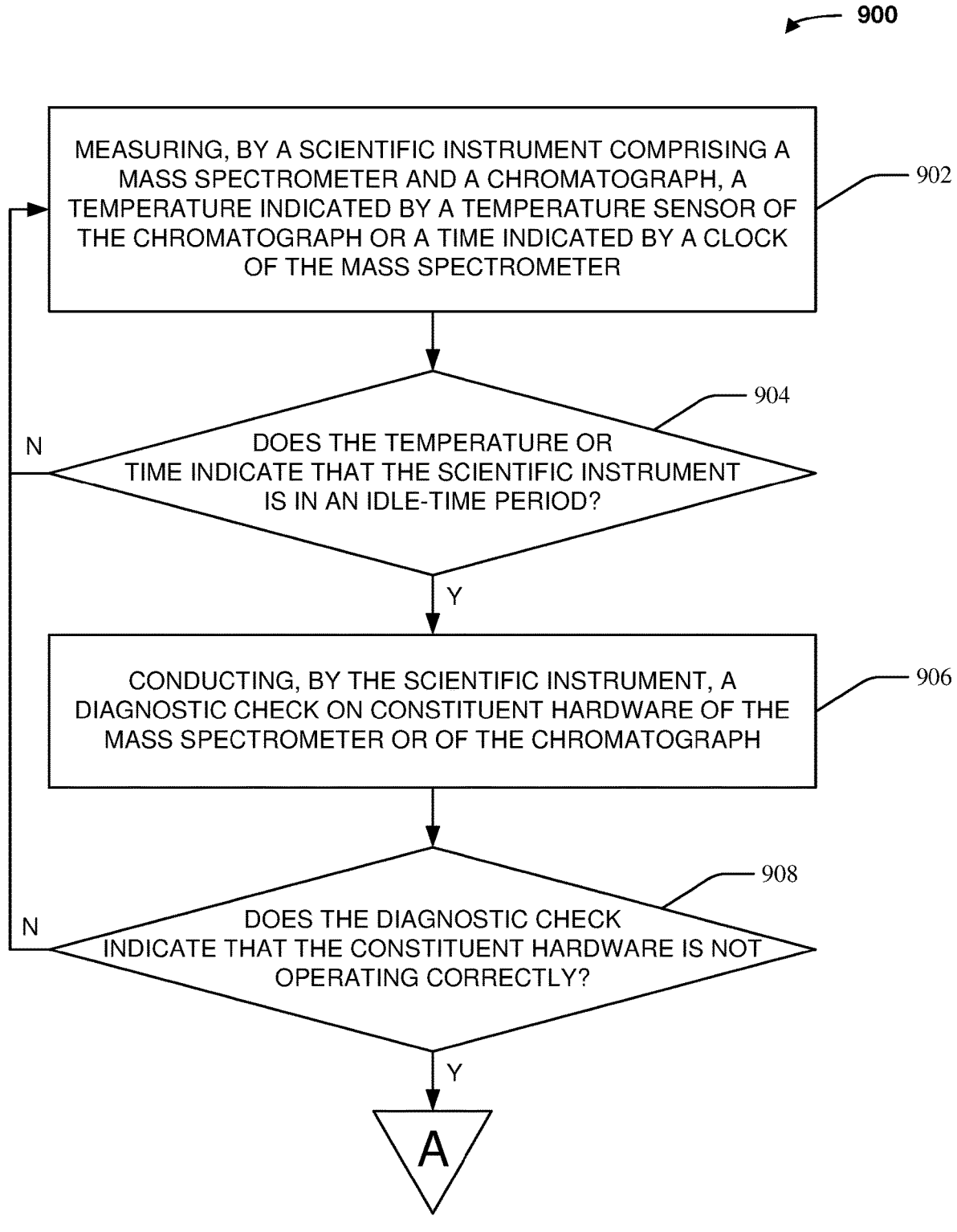

MEASURING, BY A SCIENTIFIC INSTRUMENT COMPRISING A MASS SPECTROMETER AND A CHROMATOGRAPH, A TEMPERATURE INDICATED BY A TEMPERATURE SENSOR OF THE CHROMATOGRAPH OR A TIME INDICATED BY A CLOCK OF THE MASS SPECTROMETER — 902

DOES THE TEMPERATURE OR TIME INDICATE THAT THE SCIENTIFIC INSTRUMENT IS IN AN IDLE-TIME PERIOD? — 904

N

Y

CONDUCTING, BY THE SCIENTIFIC INSTRUMENT, A DIAGNOSTIC CHECK ON CONSTITUENT HARDWARE OF THE MASS SPECTROMETER OR OF THE CHROMATOGRAPH — 906

DOES THE DIAGNOSTIC CHECK INDICATE THAT THE CONSTITUENT HARDWARE IS NOT OPERATING CORRECTLY? — 908

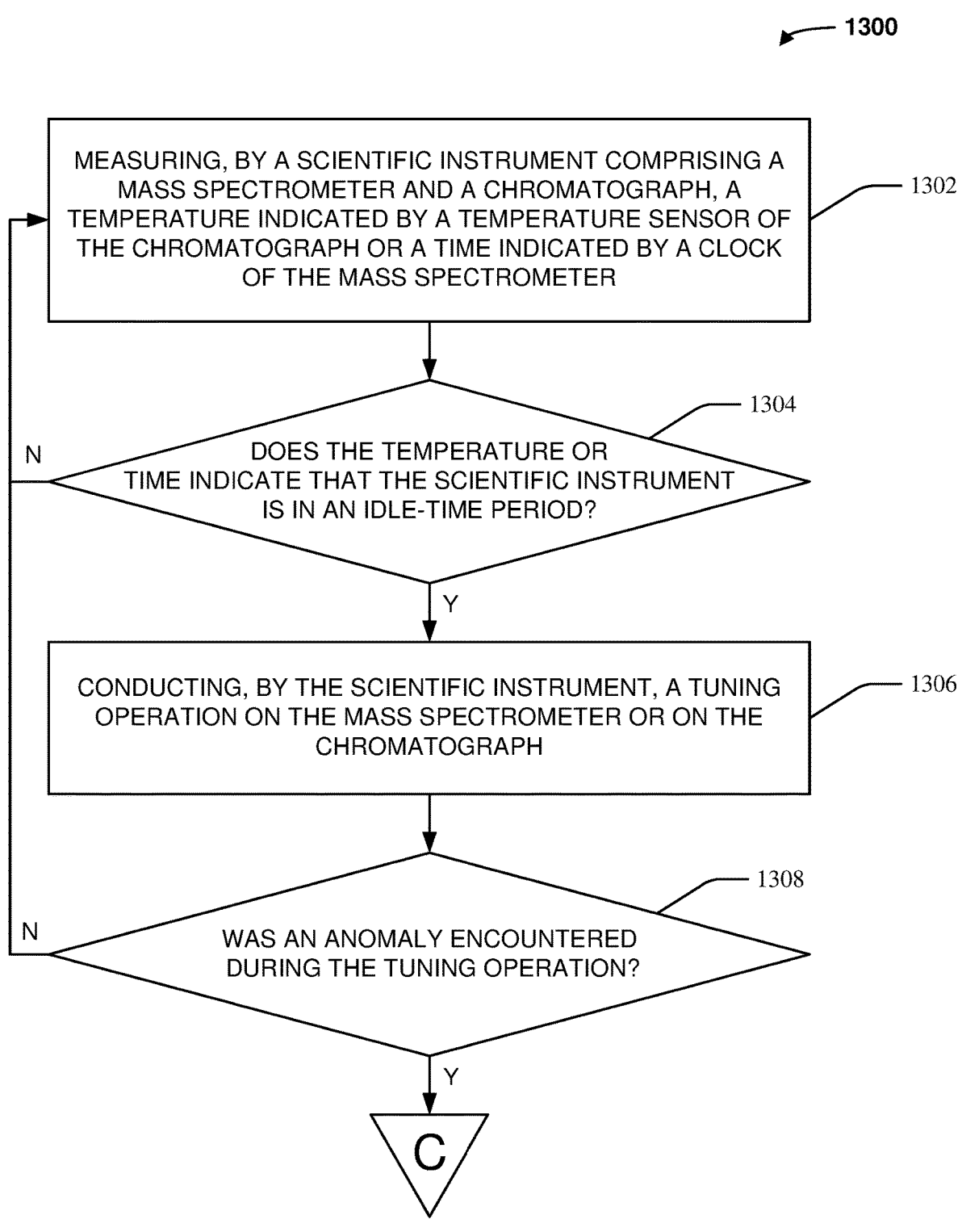

MEASURING, BY A SCIENTIFIC INSTRUMENT COMPRISING A MASS SPECTROMETER AND A CHROMATOGRAPH, A TEMPERATURE INDICATED BY A TEMPERATURE SENSOR OF THE CHROMATOGRAPH OR A TIME INDICATED BY A CLOCK OF THE MASS SPECTROMETER — 1302

DOES THE TEMPERATURE OR TIME INDICATE THAT THE SCIENTIFIC INSTRUMENT IS IN AN IDLE-TIME PERIOD? — 1304

N

Y

CONDUCTING, BY THE SCIENTIFIC INSTRUMENT, A TUNING OPERATION ON THE MASS SPECTROMETER OR ON THE CHROMATOGRAPH — 1306

WAS AN ANOMALY ENCOUNTERED DURING THE TUNING OPERATION? — 1308

Figure 14:
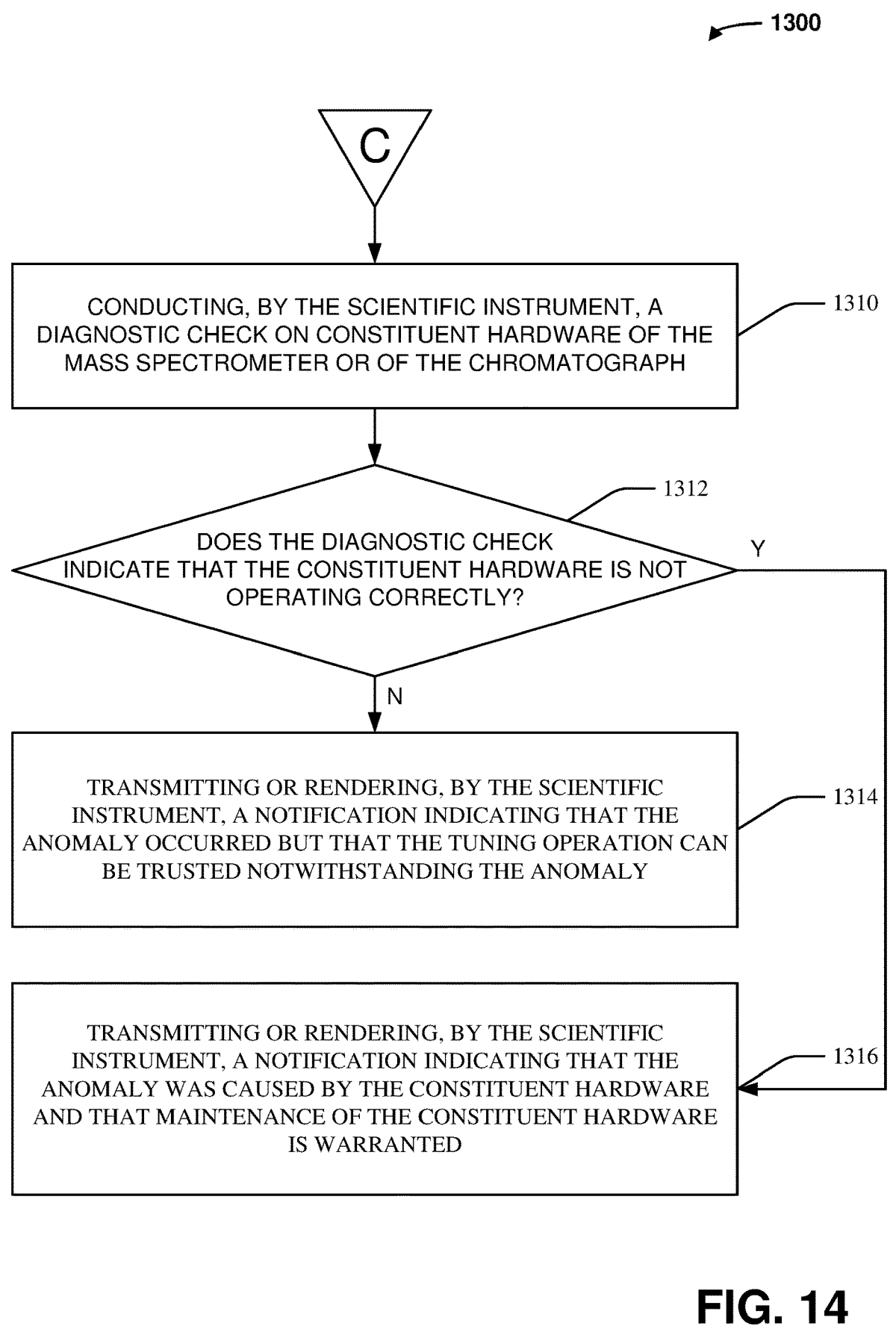

CONDUCTING, BY THE SCIENTIFIC INSTRUMENT, A DIAGNOSTIC CHECK ON CONSTITUENT HARDWARE OF THE MASS SPECTROMETER OR OF THE CHROMATOGRAPH — 1310

DOES THE DIAGNOSTIC CHECK INDICATE THAT THE CONSTITUENT HARDWARE IS NOT OPERATING CORRECTLY? — 1312

Y

N

TRANSMITTING OR RENDERING, BY THE SCIENTIFIC INSTRUMENT, A NOTIFICATION INDICATING THAT THE ANOMALY OCCURRED BUT THAT THE TUNING OPERATION CAN BE TRUSTED NOTWITHSTANDING THE ANOMALY — 1314

TRANSMITTING OR RENDERING, BY THE SCIENTIFIC INSTRUMENT, A NOTIFICATION INDICATING THAT THE ANOMALY WAS CAUSED BY THE CONSTITUENT HARDWARE AND THAT MAINTENANCE OF THE CONSTITUENT HARDWARE IS WARRANTED — 1316

DISPLAY REGION 1502

DATA ANALYSIS REGION 1504

SCIENTIFIC INSTRUMENT CONTROL REGION 1506

SETTING REGION 1508

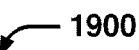
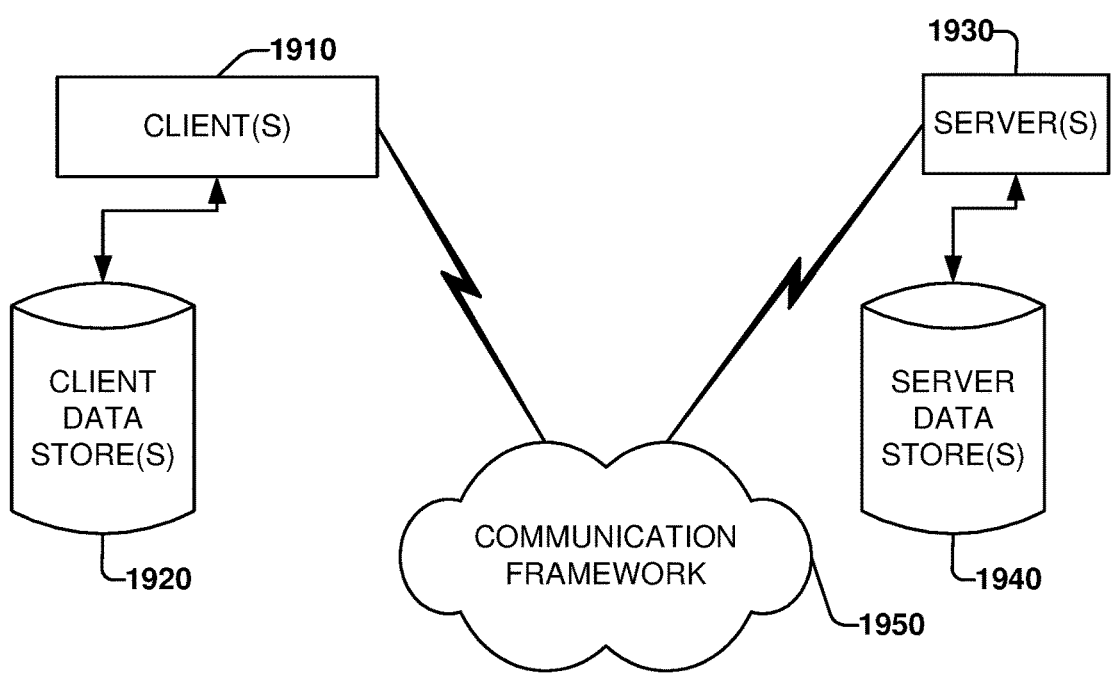
FIG. 19

IDLE-TRIGGERED DIAGNOSTICS FOR SCIENTIFIC INSTRUMENTS

BACKGROUND

Scientific instruments can comprise complex arrangements of actuatable parts, sensors, or consumables. Gradual or sudden degradation of any portion of such complex arrangements can occur throughout the useful lives of scientific instruments, which can be undesirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate idle-triggered diagnostics for scientific instruments are described.

According to one or more embodiments, a scientific instrument is provided. The scientific instrument can comprise a mass spectrometer coupled to a chromatograph. The scientific instrument can further comprise a non-transitory computer-readable memory that can store computer-executable components. The scientific instrument can further comprise a processor that can be operably coupled to the non-transitory computer-readable memory and that can execute the computer-executable components stored in the non-transitory computer-readable memory. In various embodiments, the computer-executable components can comprise a determination component that can determine, via a temperature sensor of the chromatograph or via a clock of the mass spectrometer, whether the scientific instrument is in an idle-time period. In various aspects, the computer-executable components can comprise a check component that, in response to a determination that the scientific instrument is in the idle-time period, can apply one or more electronic control signals to the mass spectrometer or to the chromatograph, can measure one or more resultant ion spectra via an ion detector of the mass spectrometer, and can determine whether the mass spectrometer or the chromatograph is operating correctly based on the one or more resultant ion spectra.

According to one or more embodiments, a computer-implemented method is provided. In various embodiments, the computer-implemented method can comprise determining, by a scientific instrument comprising a mass spectrometer coupled to a chromatograph, whether the scientific instrument is in an idle-time period, based on a temperature sensor of the chromatograph or based on a clock of the mass spectrometer. In various aspects, the computer-implemented method can comprise executing, by the scientific instrument and based at least in part on a determination that the scientific instrument is in the idle-time period, a diagnostic check on the mass spectrometer or on the chromatograph.

According to one or more embodiments, a computer program product for facilitating idle-triggered diagnostics for scientific instruments is provided. In various embodiments, the computer program product can comprise a non-transitory computer-readable memory having program instructions embodied therewith. In various aspects, the program instructions can be executable by a processor to cause the processor to measure a temperature of a chromatograph that is coupled to a mass spectrometer. In various instances, the program instructions can be executable to cause the processor to execute, in response to a determination that the temperature indicates an idle-time period of the mass spectrometer, a tuning operation on the mass spectrometer. In various cases, the program instructions can be executable to cause the processor to verify whether the tuning operation was successful, by executing, during the idle-time period and after the tuning operation, a diagnostic check on the mass spectrometer, wherein the diagnostic check can involve measuring an ion spectrum via an ion detector of the mass spectrometer and comparing the ion spectrum to a threshold.

DESCRIPTION OF THE DRAWINGS

Various embodiments will be readily understood by the following detailed description in conjunction with the accompanying figures. To facilitate this description, like reference numerals designate like structural elements. Embodiments are illustrated by way of example, not by way of limitation, in the figures. The figures are not necessarily drawn to scale.

FIG. 1 illustrates an example, non-limiting block diagram of a scientific instrument module in accordance with various embodiments described herein.

FIG. 7 illustrates a flow diagram of an example, non-limiting computer-implemented method that facilitates idle-triggered diagnostics in accordance with one or more embodiments described herein.

FIGS. 9-14 illustrate flow diagrams of example, non-limiting computer-implemented methods that facilitate idle-triggered diagnostics in conjunction with tuning operations in accordance with one or more embodiments described herein.

FIG. 19 illustrates an example networking environment operable to execute various implementations described herein.

DETAILED DESCRIPTION

Figure 2:
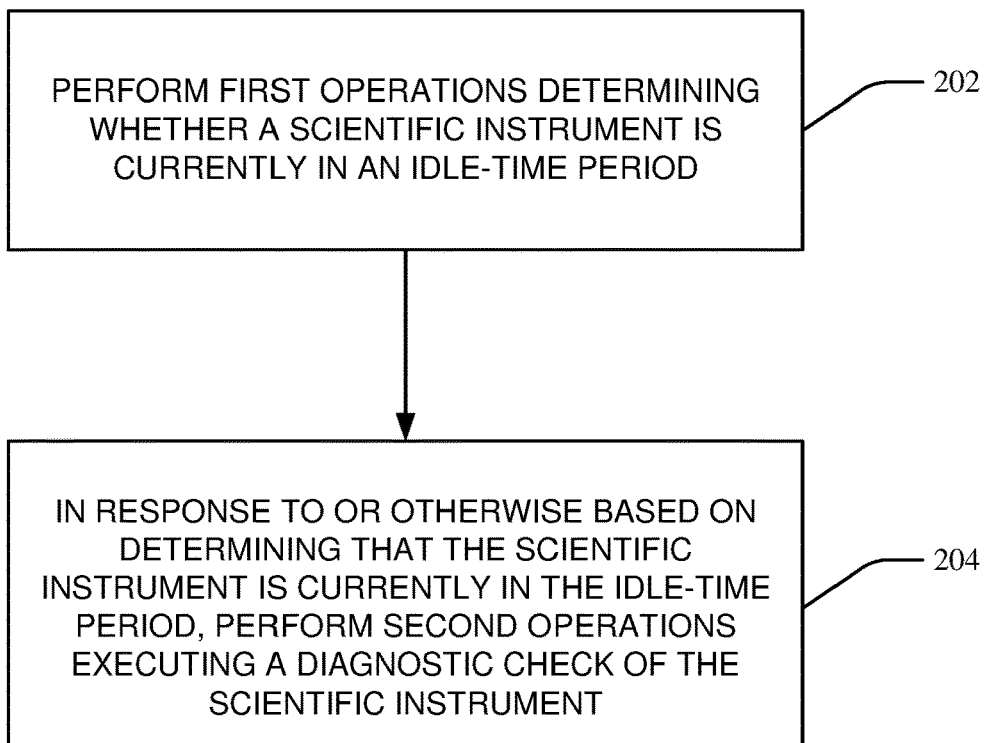
FIG. 2 is an example, non-limiting flow diagram of a computer-implemented method in accordance with various embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various operations can be described as multiple discrete actions or operations in turn, in a manner that is most helpful in understanding the subject matter disclosed herein. However, the order of description should not be construed as to imply that these operations are necessarily order dependent. In particular, these operations can be performed in an order different from the order of presentation. Operations described can be performed in a different order from the described embodiments. Various additional operations can be performed, or described operations can be omitted in additional embodiments.

Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices. As used herein, the phrase "based on" should be understood to mean "based at least in part on," unless otherwise specified.

A scientific instrument can be any suitable computerized device that can capture electronic measurements in a scientific, laboratory, research, or clinical operational context or setting. As a non-limiting example, a scientific instrument can be a mass spectrometer coupled to a chromatograph, which can aid in determining the chemical composition or make-up of unknown samples. As another non-limiting example, a scientific instrument can be a scanning electron microscope, which can aid in determining the surface topography of microscopic or nanoscopic samples.

In any case, a scientific instrument can comprise a complex arrangement of actuatable parts (e.g., ion sources, ion lenses, heaters, coolers, fluid valves, fluid pumps, circuit switches), sensors (e.g., ion detectors, voltmeters, thermistors, potentiometers, pressure gauges), or consumables (e.g., carrier fluids, calibrants, filters). Gradual or sudden degradation of any portion of such complex arrangement can occur throughout a useful life of the scientific instrument (e.g., as the scientific instrument experiences wear and tear).

Such degradation can adversely affect how accurately or reliably the scientific instrument is able to analyze samples, which can be considered as undesirable.

Accordingly, systems or techniques that can ameliorate such degradation can be considered as desirable.

Various embodiments described herein can address such degradation. One or more embodiments described herein can include systems, computer-implemented methods, apparatus, or computer program products that can facilitate idle-triggered diagnostics for scientific instruments.

In particular, a scientific instrument can be able to perform a diagnostic check on itself, so as to ensure that its constituent hardware is functioning healthily, within defined tolerances, or otherwise as expected. If the diagnostic check shows that one or more pieces of hardware of the scientific instrument are not operating healthily, within those defined tolerances, or otherwise as expected, it can be concluded that the scientific instrument has experienced some form of degradation, and a user or technician associated with the scientific instrument can accordingly act to repair or fix such degradation.

However, as the inventors of various embodiments described herein recognized, existing techniques experience various disadvantages regarding scheduling of such diagnostic checks. Indeed, existing techniques cause the scientific instrument to perform such diagnostic checks only upon direct manual prompting by the user or technician (e.g., the user or technician can interact with a graphical user interface of the scientific instrument, and such interaction can cause the scientific instrument to initiate or commence the diagnostic check, either immediately or at a future time specified by the user or technician). Because such existing techniques rely upon manual prompting by the user or technician, such existing techniques are vulnerable to performing diagnostic checks less frequently than might be recommended (e.g., a user or technician can forget or deliberately choose not to manually initiate or schedule a diagnostic check at any given time). Accordingly, when existing techniques are implemented, the scientific instrument can be considered as being more likely to experience degradation that goes undetected or unaddressed.

Various embodiments described herein can ameliorate this technical problem via idle-triggered diagnostic checks. In particular, various embodiments described herein can involve a scientific instrument determining whether or not it is currently in an idle-time period. In various aspects, the idle-time period can be any span, interval, window, or moment of time during which the scientific instrument is not being used to measure or analyze a sample. In some instances, the scientific instrument can facilitate such determination via one or more temperature, pressure, voltage, or fluid sensors that it may comprise (e.g., if the scientific instrument is not currently at an operating temperature, at an operating pressure, at an operating voltage, or at an operating fluid level, it can be concluded that the scientific instrument is not analyzing or about to analyze a sample and is thus in the idle-time period). In other instances, the scientific instrument can facilitate such determination via a clock that it may comprise (e.g., the scientific instrument can be scheduled to analyze a sample during a defined time span; if the current time lies outside of that scheduled time span, it can be concluded that the scientific instrument is not analyzing a sample or about to analyze a sample and is thus in the idle-time period). In any case, in response to or otherwise based on determining that the scientific instrument is currently in the idle-time period, the scientific instrument can perform a diagnostic check on itself. In other words, the diagnostic check can be considered as being triggered by the idle-time period. In still other words, various embodiments described herein can be considered as automatically transforming time during which the scientific instrument would otherwise sit idle into time productively spent performing self-diagnostics. By leveraging idle-time as a trigger for diagnostic checks, various embodiments described herein can be considered as making diagnostic checks no longer reliant or predicated upon manual prompting by users or technicians. Accordingly, the likelihood of the scientific instrument experiencing unaddressed degradation can be reduced.

Furthermore, various embodiments described herein can involve a rich interplay between diagnostic checks performable by the scientific instrument and tuning operations performable by the scientific instrument. Indeed, like a diagnostic check, the scientific instrument can be able to perform a tuning operation on itself. However, unlike a diagnostic check which can determine whether a piece of hardware of the scientific instrument is functioning healthily, within defined tolerances, or otherwise as expected, a tuning operation can instead involve calibrating one or more configurable parameters (e.g., voltage ramp rate, detector gain, mass resolution, mass range, sensitivity) of the scientific instrument so that the scientific instrument analyzes a sample in a desired way.

In various embodiments, the scientific instrument can perform a tuning operation based on an idle-triggered diagnostic check. In particular, the scientific instrument can perform a diagnostic check in response to determining that it is currently in the idle-time period, and the scientific instrument can further perform, in response to the diagnostic check indicating that some constituent hardware of the scientific instrument is not functioning healthily, a tuning operation on or otherwise with respect to that constituent hardware. In such cases, the subsequent tuning operation can be considered as an automated attempt to rectify a problem detected by the diagnostic check.

In other embodiments, the scientific instrument can perform a diagnostic check to help verify an idle-triggered tuning operation. More specifically, the scientific instrument can perform a tuning operation in response to determining that it is currently in the idle-time period, and the scientific instrument can further perform, in response to completion of the tuning operation, a diagnostic check. If the diagnostic check indicates that the scientific instrument is not functioning healthily, it can be concluded that the tuning operation was unsuccessful or otherwise not trustworthy.

In yet other embodiments, the scientific instrument can perform a diagnostic check to help explain an unusual idle-triggered tuning operation. More specifically, the scientific instrument can perform a tuning operation in response to determining that it is currently in the idle-time period, and the scientific instrument can further perform, in response to encountering an anomaly (e.g., a flat or misshapen tune curve) of the tuning operation, a diagnostic check. If the diagnostic check indicates that some constituent hardware of the scientific instrument is not functioning healthily, it can be concluded that damage or degradation of the constituent hardware caused or otherwise is responsible for the tuning anomaly.

In this way, idle-triggered diagnostic checks and idle-triggered tuning operations can inform or otherwise react to one another, which can help to deepen or enhance automated self-monitoring capabilities of scientific instruments.

Various embodiments described herein can be considered as a computerized tool (e.g., any suitable combination of computer-executable hardware or computer-executable software) that can be electronically installed on or otherwise with respect to a scientific instrument and that can facilitate idle-triggered diagnostics for the scientific instrument. In various aspects, such computerized tool can comprise an access component, a determination component, a check component, or a result component.

In some embodiments, the scientific instrument can comprise a mass spectrometer and a chromatograph. In various aspects, the mass spectrometer can comprise any suitable constituent hardware. As some non-limiting examples, the mass spectrometer can comprise any suitable ion beam emitter (e.g., electron ionizer, chemical ionizer, matrix assisted laser desorption ionizer, electrospray ionizer, atmospheric pressure photoionizer, inductively coupled plasma ionizer), any suitable mass analyzer (e.g., quadrupole mass analyzer, ion trap mass analyzer, time-of-flight mass analyzer, sector mass analyzer), any suitable ion detector (e.g., electron multiplier detector, Faraday cup detector), or any suitable ion optics equipment (e.g., ion focusing lenses, ion guides, ion deflectors). Likewise, in various instances, the chromatograph can comprise any suitable constituent hardware (e.g., gas chromatography hardware, liquid chromatography hardware). As some non-limiting examples, the chromatograph can comprise any suitable sample injector (e.g., electrospray needle), any suitable chromatograph column (e.g., comprising any suitable stationary phase), any suitable column oven or heater, or any suitable carrier fluid flow devices (e.g., fluid valves, fluid pumps). In various cases, when given any sample, the sample can be injected into the chromatograph, the sample can be separated into various compositional components by the chromatograph, and those various compositional components can be ionized and subsequently analyzed by the mass spectrometer (e.g., the mass spectrometer can record relative abundances of sample ions as a function of mass-to-charge ratio).

In various embodiments, the access component of the computerized tool can electronically access the chromatograph or the mass spectrometer. That is, the access component can electronically interface or communicate with the chromatograph or with the mass spectrometer, such that other components of the computerized tool can electronically interact with (e.g., send electronic commands to, read electronic signals from) the chromatograph or the mass spectrometer.

In various embodiments, the determination component of the computerized tool can electronically determine whether the chromatograph or the mass spectrometer is currently in an idle-time period. In various aspects, the idle-time period can, as its name suggests, be any suitable span of time (e.g., on the scale of seconds, minutes, or hours) during which the chromatograph or the mass spectrometer is sitting idle (e.g., is not analyzing or otherwise operating on a sample). In some cases, the idle-time period can span hours (e.g., such as overnight). In other cases, the idle-time period can span seconds or minutes (e.g., such as in between sample runs). In various aspects, the determination component can perform or facilitate such determination in any suitable fashion.

As a non-limiting example, the chromatograph can have one or more temperature sensors embedded within it. In various instances, the determination component can leverage those temperature sensors to determine whether the chromatograph and the mass spectrometer are in the idle-time period. Indeed, the determination component can measure one or more interior temperatures (e.g., column temperature, column oven temperature) of the chromatograph, and the determination component can infer the idle-time period based on those interior temperatures. For instance, if those interior temperatures are equal to or otherwise within any suitable threshold margin of known operating temperatures of the chromatograph, the determination component can infer that the chromatograph is currently analyzing (or about to analyze) a sample. Thus, in such case, the determination component can conclude that the chromatograph and the mass spectrometer are not in the idle-time period. On the other hand, if those interior temperatures are equal to or otherwise within any suitable threshold margin of known idle (e.g., stabilization) temperatures of the chromatograph, the determination component can instead infer that the chromatograph is not currently analyzing (and is not about to analyze) a sample. Thus, in such case, the determination component can conclude that the chromatograph and the mass spectrometer are in the idle-time period.

As another non-limiting example, the mass spectrometer can have a clock embedded within it. In various aspects, the determination component can leverage the clock to determine whether the chromatograph and the mass spectrometer are in the idle-time period. Indeed, in some instances, the mass spectrometer can be scheduled to analyze a sample during a particular time span. If the current time as measured by the clock of the mass spectrometer is inside of (or less than a threshold amount of time before) the particular time span, then the determination component can infer that the mass spectrometer is currently analyzing (or about to analyze) a sample. Thus, in such case, the determination component can conclude that the chromatograph and the mass spectrometer are not in the idle-time period. On the other hand, if the current time as measured by the clock of the mass spectrometer is outside of (and more than the threshold amount of time before) the particular time span, then the determination component can infer that the mass spectrometer is not currently analyzing (and not about to analyze) a sample. Thus, in such case, the determination component can conclude that the chromatograph and the mass spectrometer are in the idle-time period.

In any case, the determination component can determine whether or not the chromatograph and the mass spectrometer are in the idle-time period.

In various embodiments, the check component of the computerized tool can, in response to the determination component concluding that the chromatograph and the mass spectrometer are not in the idle-time period, refrain from taking action. However, the check component can, in response to the determination component concluding that the chromatograph and the mass spectrometer are in the idle-time period, electronically perform (or otherwise electronically cause the performance of) a diagnostic check on the mass spectrometer or on the chromatograph (e.g., such that the diagnostic check is conducted during the idle-time period). Accordingly, the diagnostic check can be considered as being automatically triggered or caused by detection of the idle-time period.

In various aspects, the diagnostic check can involve applying, by the check component, one or more electronic control signals to the chromatograph or to the mass spectrometer. Such electronic control signals can activate, deactivate, or otherwise actuate any suitable controllable features of the constituent hardware of the chromatograph or of the mass spectrometer. In various instances, the diagnostic check can further involve recording, by the check component, one or more ion abundances that are measured by the ion detector of the mass spectrometer and that can be considered as resulting from or otherwise relating to the one or more electronic control signals. In various cases, the check component can compare those measured ion abundances against each other or against any suitable thresholds, so as to make a diagnostic determination regarding one or more pieces of constituent hardware of the chromatograph or of the mass spectrometer (e.g., if the one or more measured ion abundances are within defined tolerances, it can be concluded or inferred that the constituent hardware is operating healthily; if the one or more measured ion abundance are not within defined tolerances, it can instead be concluded or inferred that the constituent hardware is operating unhealthily). As some non-limiting examples, the diagnostic check can be an ion optics lens connection check, an ion optics lens charging check, a carrier fluid leak check, an ion detector background noise check, an ion fragmentation check, an electrospray stability check, or a calibrant solution check.

However, in some embodiments, the diagnostic check can more generally involve applying the one or more electronic control signals to the chromatograph or to the mass spectrometer, recording one or more electronic readback signals (e.g., not necessarily ion spectra) measured by any suitable electronic sensors of the chromatograph or of the mass spectrometer (e.g., temperature sensors, pressure sensors, voltage sensors, strain gauges) that can be considered as resulting from or otherwise relating to the one or more electronic control signals, and comparing those readback signals against each other or against any suitable thresholds to make the diagnostic determination. As some non-limiting examples, the diagnostic check can be an electronic communications check, a filament control check, a transfer tube check, or a polarity switching check.

In any case, the check component can perform the diagnostic check during the idle-time period, so as to determine whether or not the chromatograph or the mass spectrometer has experienced degradation or requires maintenance. In this way, time that would otherwise have been unproductively squandered can instead be productively spent on automated diagnostics that do not rely upon manual prompting for performance.

In some embodiments, the check component can electronically perform (or otherwise electronically cause the performance of) a tuning operation on the mass spectrometer or on the chromatograph, in conjunction with the diagnostic check. This can yield a rich interplay in which the diagnostic check informs the tuning operation or vice versa, which can be considered as enhancing the self-monitoring capabilities of the scientific instrument.

As a non-limiting example, the check component can, as mentioned above, perform the diagnostic check in response to detection of the idle-time period. In various aspects, the check component can, in response to the diagnostic check indicating that the chromatograph or the mass spectrometer is operating healthily, refrain from taking further action. However, the check component can, in response to the diagnostic check indicating that the chromatograph or the mass spectrometer is operating unhealthily, perform the tuning operation on the chromatograph or on the mass spectrometer. In various instances, this can be considered as an automated attempt to fix or rectify whatever unhealthy condition was detected by the diagnostic check.

As another non-limiting example, the check component can perform the tuning operation in response to detection of the idle-time period, and the check component can, upon completion of the tuning operation, perform the diagnostic check. If the diagnostic check indicates that the chromatograph or the mass spectrometer is operating healthily, the check component can conclude or infer that the tuning operation was successful, valid, or otherwise trustworthy. In contrast, if the diagnostic check indicates that the chromatograph or the mass spectrometer is operating unhealthily, the check component can conclude or infer that the tuning operation was unsuccessful, invalid, or otherwise untrustworthy. In this way, the diagnostic check can be considered as helping to verify or validate the tuning operation.

As yet another non-limiting example, the check component can perform the tuning operation in response to detection of the idle-time period, and the check component can, in response to an anomaly (e.g., an unexpected or unusual tune curve) being encountered during the tuning operation, perform the diagnostic check. If the diagnostic check indicates that the chromatograph or the mass spectrometer is operating healthily, the check component can conclude or infer that the tuning operation was successful, valid, or otherwise trustworthy, notwithstanding the anomaly. In contrast, if the diagnostic check indicates that the chromatograph or the mass spectrometer is operating unhealthily, the check component can conclude or infer that the tuning operation was rendered unsuccessful, invalid, or otherwise untrustworthy by the anomaly. Indeed, in some cases, if the diagnostic check shows that a specific piece of constituent hardware of the chromatograph or of the mass spectrometer is not operating healthily, that specific piece of constituent hardware can be considered as being responsible for (e.g., as causing) the anomaly. In this way, the diagnostic check can be considered as helping to troubleshoot any anomalous behavior encountered during the tuning operation.

In various embodiments, the result component of the computerized tool can perform any suitable electronic actions, based upon the diagnostic check (or upon the tuning operation) performed by the check component. As a non-limiting example, the result component can visually render, on any suitable electronic display (e.g., computer screen, computer monitor) of the chromatograph or of the mass spectrometer, an electronic notification that indicates (e.g., via text, numbers, or graphs) whatever determinations, inferences, or conclusions that the check component makes based on the diagnostic check (or based on the tuning operation). Accordingly, the user or technician of the scientific instrument can become apprised of such determinations, inferences, or conclusions, so as to know whether or not maintenance of the chromatograph or of the mass spectrometer is warranted.

Various embodiments described herein can be employed to use hardware or software to solve problems that are highly technical in nature (e.g., to facilitate idle-triggered diagnostics for scientific instruments), that are not abstract and that cannot be performed as a set of mental acts by a human. Further, some of the processes performed can be performed by a specialized computer (e.g., mass spectrometer comprising an ion detector) for carrying out defined acts related to scientific instruments.

For example, such defined acts can comprise: determining, by a scientific instrument comprising a mass spectrometer coupled to a chromatograph, whether the scientific instrument is in an idle-time period, based on a temperature sensor of the chromatograph or based on a clock of the mass spectrometer; and executing, by the scientific instrument and based at least in part on a determination that the scientific instrument is in the idle-time period, a diagnostic check on the mass spectrometer or on the chromatograph. In various aspects, the diagnostic check can comprise: applying one or more electronic control signals to the mass spectrometer or to the chromatograph; measuring one or more resultant ion spectra via an ion detector of the mass spectrometer; and determining whether the mass spectrometer or the chromatograph is operating correctly based on the one or more resultant abundances. Furthermore, in some instances, such defined tasks can further comprise: executing, by the scientific instrument, a tuning operation on the mass spectrometer or on the chromatograph, wherein the tuning operation and the diagnostic check can inform each other (e.g., the tuning operation can be considered as an attempt to rectify an issue detected by the diagnostic check; the diagnostic check can be considered as verifying the efficacy of the tuning operation; the diagnostic check can be considered as identifying a cause of an anomaly encountered during the tuning operation).

Such defined acts are inherently computerized. Indeed, scientific instruments, such as chromatographs and mass spectrometers, are highly-technical computerized devices comprising specific computerized hardware (e.g., temperature sensors, pressure sensors, voltage sensors, ion beam emitters, ion focusing lenses, mass analyzers, ion detectors). A scientific instrument and the operations that it performs cannot be implemented by the human mind, or by a human with pen and paper, in any reasonable or practicable way without computers.

Moreover, various embodiments described herein can integrate into a practical application various teachings relating to idle-triggered diagnostics for scientific instruments. As explained above, a scientific instrument can perform a diagnostic check on itself, so as to determine whether or not its constituent hardware is operating within defined tolerances. When existing techniques are implemented, the scientific instrument performs the diagnostic check on itself only upon being manually prompted by a user or technician of the scientific instrument. Such reliance upon manual prompting can yield situations in which the diagnostic check is performed less frequently than is desirable (e.g., the user or technician may forget or choose not to prompt the diagnostic check), which can cause the scientific instrument to experience unaddressed or unrectified degradation of its constituent hardware.

Various embodiments described herein can help to ameliorate such unaddressed or unrectified degradation via idle-triggered diagnostics. In particular, various embodiments described herein can involve automatically detecting (e.g., via temperature, pressure, voltage, or time sensors) whether or not the scientific instrument is currently in an idle-time period, and automatically performing, in response to or otherwise based on detection of the idle-time period, a diagnostic check (e.g., ion lens connection check, ion lens charging check, carrier fluid check, electrostatic sprayer check) on the scientific instrument. That is, the diagnostic check can be triggered or otherwise caused by the idle-time period. Such embodiments can facilitate the diagnostic check being performed more frequently than would otherwise occur with existing techniques that rely upon manual prompting. Thus, such embodiments can help to reduce the likelihood of situations in which the scientific instrument analyzes samples with degraded constituent hardware. Furthermore, various embodiments can involve performing a tuning operation in conjunction with the diagnostic check. As described herein, there can be a rich interplay between the diagnostic check and the tuning operation, so as to enhance the automated self-monitoring capabilities of the scientific instrument (e.g., the tuning operation can be considered as an attempt to fix a problem that has been identified by the diagnostic check; the diagnostic check can be considered as a way of verifying whether or not the tuning operation can be considered as valid or trustworthy; the diagnostic check can be considered as a way of identifying a potential cause of an anomaly encountered during the tuning operation). Existing techniques do not benefit from such rich interplay. For at least these reasons, various embodiments described herein can be considered as a concrete and tangible technical improvement in the field of scientific instruments. Accordingly, various embodiments described herein certainly qualify as useful and practical applications of computers.

Furthermore, various embodiments described herein can control real-world tangible devices based on the disclosed teachings. For example, various embodiments described herein can electronically activate, deactivate, or otherwise actuate real-world hardware (e.g., ion beam emitters, ion focusing lenses, carrier fluid valves/pumps) of real-world scientific instruments (e.g., chromatographs, mass spectrometers).

Figure 1:
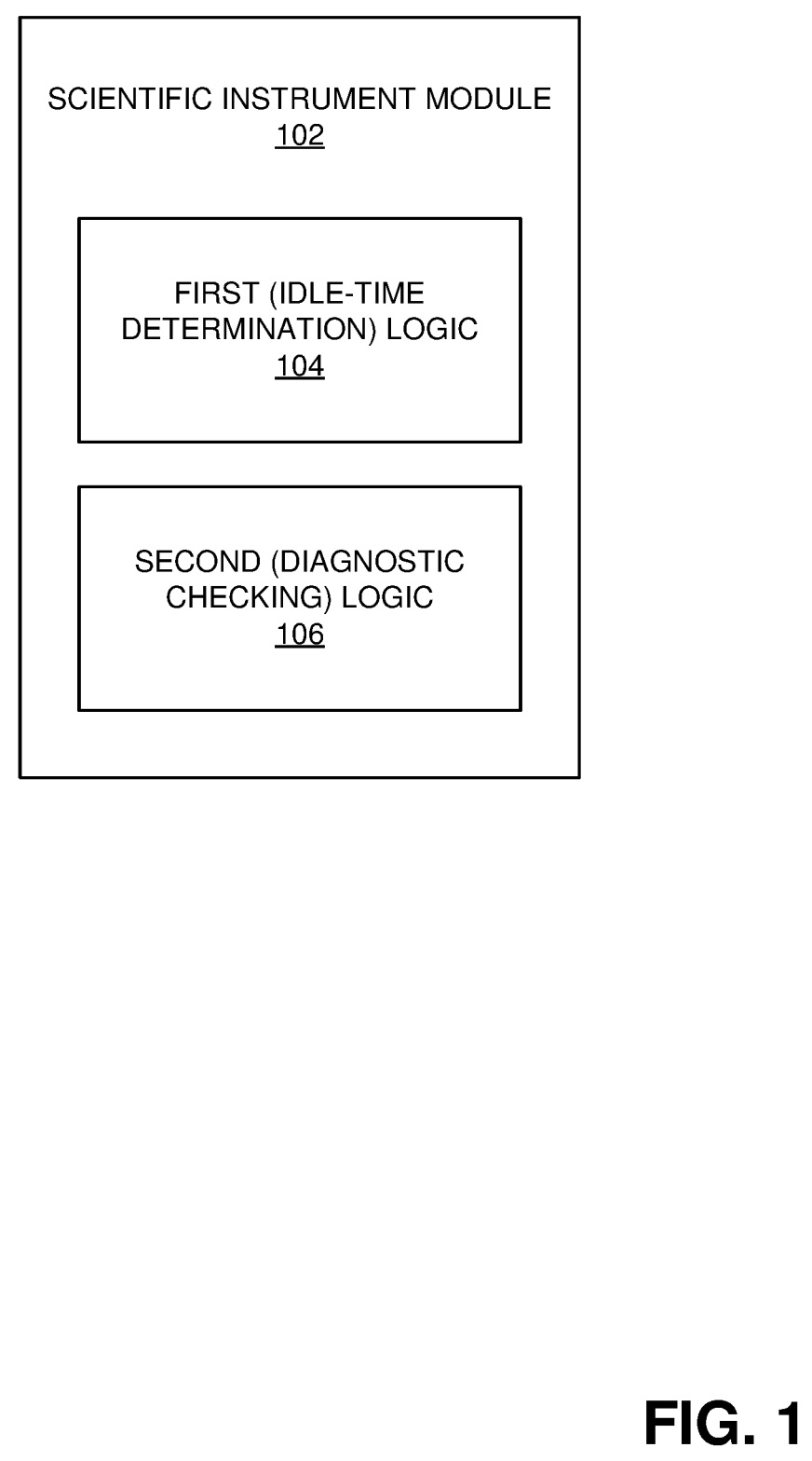

FIG. 1 illustrates an example, non-limiting block diagram of a scientific instrument module 102 in accordance with various embodiments described herein.

In various embodiments, the scientific instrument module 102 can be implemented by circuitry (e.g., including electrical or optical components), such as a programmed computing device. Logic of the scientific instrument module 102 can be included in a single computing device or can be distributed across multiple computing devices that are in communication with each other as appropriate. Examples of computing devices that may, singly or in combination, implement the scientific instrument module 102 are discussed herein with reference to FIGS. 16 and 18, and examples of systems or networks of interconnected computing devices, in which the scientific instrument module 102 may be implemented across one or more of the computing devices, are discussed herein with reference to FIGS. 17 and 19.

The scientific instrument module 102 can include first logic 104 and second logic 106. As used herein, the term "logic" can include an apparatus that is to perform a set of operations associated with the logic. For example, any of the logic elements included in the scientific instrument module 102 can be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" can refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module can omit one or more of the logic elements depicted in the associated drawings; for example, a module may include a subset of the logic elements depicted in the associated drawings when that module is to perform a subset of the operations discussed herein with reference to that module.

In various embodiments, there can be a scientific instrument corresponding to the scientific instrument module 102.

In various aspects, the scientific instrument can be any suitable computerized device that can electronically measure some scientifically-relevant, clinically-relevant, or research-relevant characteristic, property, or attribute of an analytical sample (e.g., of a known or unknown mixture, compound, or collection of matter). As a non-limiting example, a scientific instrument can be a mass spectrometer that is operatively coupled to a chromatograph. In such case, the scientific instrument can measure or determine ion spectra (e.g., relative ion abundance as a function of mass-to-charge ratio) of the analytical sample. As another non-limiting example, a scientific instrument can be a scanning electron microscope. In such case, the scientific instrument can measure or determine a surface topography of the analytical sample.

In various embodiments, the first logic 104 can determine whether or not the scientific instrument is currently in an idle-time period. In some aspects, the first logic 104 can facilitate such determination by leveraging any suitable electronic sensors that are embedded within or otherwise integrated with the scientific instrument.

As a non-limiting example, the scientific instrument can comprise a temperature, pressure, or voltage sensor that can measure a current temperature, pressure, or voltage of the scientific instrument. In some cases, if the current temperature, pressure, or voltage of the scientific instrument differs from a known operating temperature, pressure, or voltage value by less than a threshold margin, then the first logic 104 can conclude or determine that the scientific instrument is not currently in the idle-time period (e.g., the current temperature, pressure, or voltage can be close enough to the known operating temperature, pressure, or voltage value as to suggest that the scientific instrument is currently analyzing, or is about to imminently analyze, an analytical sample). On the other hand, if the current temperature, pressure, or voltage of the scientific instrument differs from the known operating temperature, pressure, or voltage value by more than the threshold margin, then the first logic 104 can conclude or determine that the scientific instrument is currently in the idle-time period (e.g., the current temperature, pressure, or voltage can be far enough from the known operating temperature, pressure, or voltage value as to suggest that the scientific instrument is not currently analyzing, and is not about to imminently analyze, an analytical sample).

In some cases, the temperature, pressure, or voltage sensor can be leveraged to measure not just the current temperature, pressure, or voltage of the scientific instrument, but also a rate or direction of change of the current temperature, pressure, or voltage, and the first logic 104 can detect the idle-time period based on such rate or direction of change. In particular, suppose that the scientific instrument is performing multiple sample runs consecutively or sequentially. For any given sample run, various temperatures, pressures, or voltages of the scientific instrument can begin at defined starting values and can be controllably ramped throughout the given sample run. Accordingly, after completion of the given sample run and prior to beginning a next sample run, the various temperatures, pressures, or voltages of the scientific instrument can be controllably reset from their ending ramped values back to their defined starting values. Such controlled resetting can consume several minutes of time and can be referred to as a stabilization period of the scientific instrument. In various aspects, such stabilization period can be detected based on the rate or direction of change of the current temperature, pressure, or voltage of the scientific instrument (e.g., if the rate or direction of change is away from the defined starting values and toward the ending ramped values, it can be concluded that the scientific instrument is currently analyzing a sample; instead, if the rate or direction of change is away from the ending ramped values and toward the defined starting values, it can be concluded that the scientific instrument is in a stabilization period and is thus not currently analyzing a sample). In various cases, a stabilization period can be considered or otherwise treated as an idle-time period. Therefore, if the temperature, pressure, or voltage sensor indicates that the scientific instrument is currently in a stabilization period, the first logic 104 can conclude that the scientific instrument is in an idle-time period.

As another non-limiting example, the scientific instrument can comprise an internal clock that can indicate a current time or date. In various aspects, the scientific instrument can be scheduled to analyze an analytical sample during a particular range of times/dates. If the current time/date is within that scheduled range of times/dates (or if the current time/date precedes that scheduled range by less than a threshold margin), then the first logic 104 can conclude or determine that the scientific instrument is not currently in the idle-time period (e.g., the current time/date can be inside, or otherwise too close to, the scheduled range as to suggest that the scientific instrument is currently analyzing, or is about to imminently analyze, an analytical sample). On the other hand, if the current time/date is outside of that scheduled range of times/dates (and if the current time/date does not precede that scheduled range by less than a threshold margin), then the first logic 104 can conclude or determine that the scientific instrument is not currently in the idle-time period (e.g., the current time/date can be outside of, and not too close to, the scheduled range as to suggest that the scientific instrument is not currently analyzing, and is not about to imminently analyze, an analytical sample).

In various embodiments, the second logic 106 can, in response to the first logic 104 determining that the scientific instrument is not currently in the idle-time period, refrain from performing any actions or operations. However, in various aspects, the second logic 106 can, in response to the first logic 104 determining that the scientific instrument is currently in the idle-time period, perform a diagnostic check on the scientific instrument. Such diagnostic check can be considered as being triggered by detection of the idle-time period. In various instances, the diagnostic check can be any suitable sequence of operations that the scientific instrument is able to automatically execute so as to verify whether or not constituent hardware of the scientific instrument is functioning within one or more defined threshold tolerances (e.g., is functioning healthily or otherwise as expected or intended). Accordingly, because different scientific instruments can have different types of constituent hardware, different scientific instruments can perform different types of diagnostic checks. As some non-limiting examples, if the scientific instrument is a chromatograph-equipped mass spectrometer, then the diagnostic check can be: an ion focusing lens connection check; an ion focusing lens charging check; a carrier fluid leak check; an ion beam emitter filament check; an ion collision check; an electrospray stability check; a calibrant solution check; a transfer tube check; or a polarity switching check.

Accordingly, the scientific instrument module 102 can facilitate idle-triggered diagnostics for scientific instruments.

FIG. 2 is an example, non-limiting flow diagram of a computer-implemented method 200 in accordance with various embodiments described herein. The operations of the computer-implemented method 200 may be used in any suitable setting to perform any suitable operations (e.g., can be performed by or used in conjunction with any of the various modules, computing devices, or graphical user interfaces described with respect to of FIGS. 1, 15, 16, 17, 18, and 19). Operations are illustrated once each and in a particular order in FIG. 2, but the operations may be reordered or repeated as desired and appropriate (e.g., different operations performed may be performed in parallel, as suitable).

In various aspects, act 202 can include performing first operations determining whether a scientific instrument is current in an idle-time period. In various cases, the first logic 104 can perform or otherwise facilitate act 202.

In various instances, act 204 can include performing, in response to or otherwise based on determining that the scientific instrument is currently in the idle-time period, second operations executing a diagnostic check on, for, or otherwise with respect to the scientific instrument. In various cases, the second logic 106 can perform or otherwise facilitate act 204.

Accordingly, the computer-implemented method 200 can facilitate idle-triggered diagnostics for scientific instruments.

Various embodiments described herein can be implemented to perform idle-triggered diagnostics on any suitable scientific instruments. As a specific and non-limiting example, various embodiments described herein can be implemented to perform idle-triggered diagnostics on a scientific instrument that comprises a chromatograph-equipped mass spectrometer. Non-limiting aspects regarding how various embodiments can be applied to a chromatograph-equipped mass spectrometer are described with respect to FIGS. 3-14.

Figure 3:
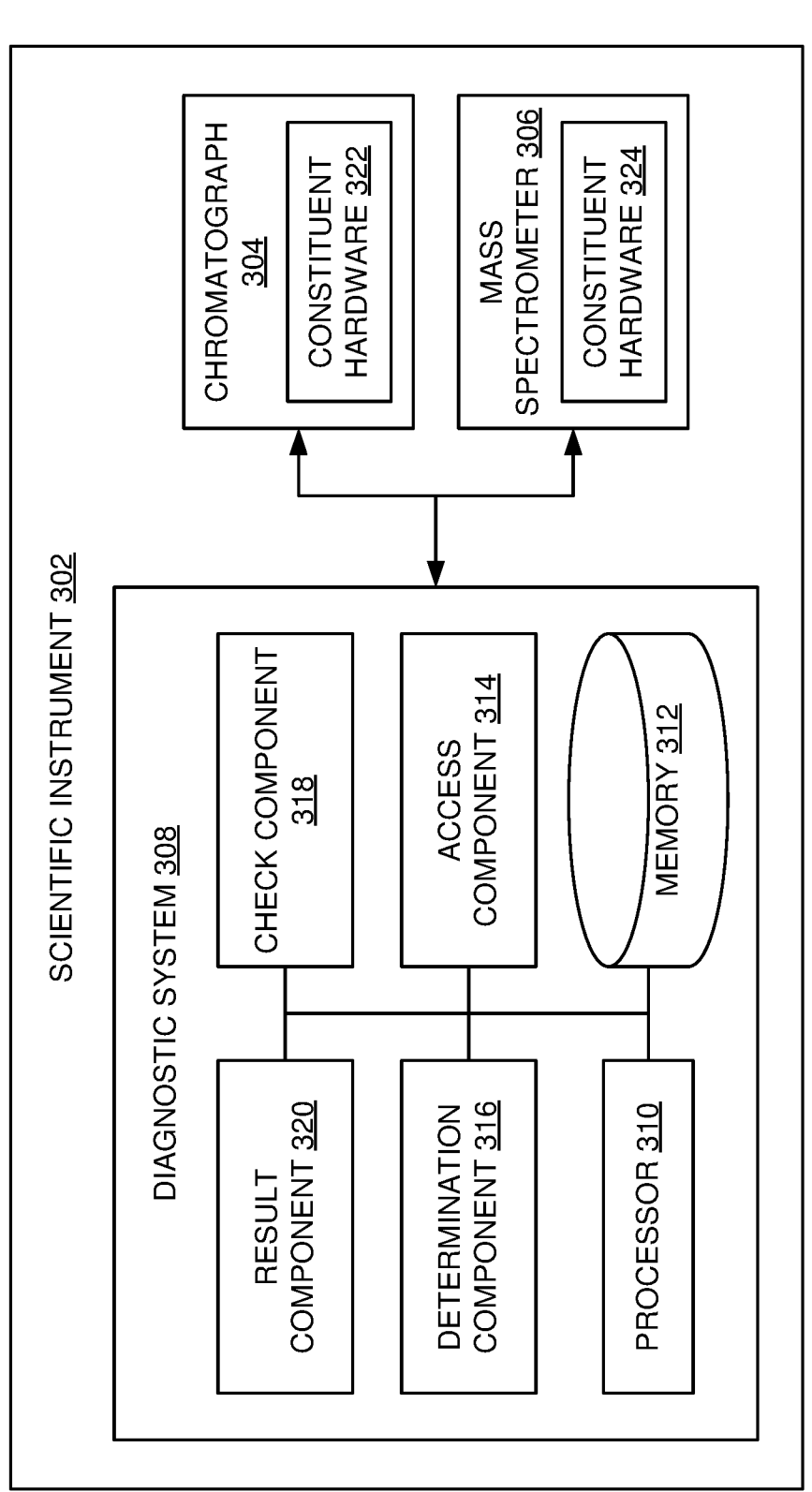
FIG. 3 illustrates a block diagram of an example, non-limiting scientific instrument that facilitates idle-triggered diagnostics in accordance with one or more embodiments described herein.

FIG. 3 illustrates a block diagram of an example, non-limiting scientific instrument that can facilitate idle-triggered diagnostics in accordance with one or more embodiments described herein. As shown, a scientific instrument 302 can comprise a chromatograph 304 and a mass spectrometer 306.

In various embodiments, the chromatograph 304 can be any suitable chromatograph, such as a gas chromatograph or a liquid chromatograph. In various aspects, the chromatograph 304 can comprise any suitable constituent hardware 322 for separating an analytical sample into two or more compositional parts. As a non-limiting example, the constituent hardware 322 can comprise an injector, an oven-heated column, and carrier fluid valves or pumps. In various aspects, the carrier fluid valves or pumps can cause carrier fluid (e.g., an inert gas, or a water-organic-solvent mixture) to flow through the chromatograph. In various instances, the injector can inject an analytical sample (e.g., a compound to be measured or analyzed) into the flowing carrier fluid. In various cases, the injected analytical sample can be carried by the flowing carrier fluid through the oven-heated column, which can contain any suitable stationary phase. In various aspects, different compositional parts (e.g., different elements or molecules) of the analytical sample can interact differently or uniquely with the stationary phase, thereby causing the different compositional parts of the analytical sample to have different flow rates through the oven-heated column. Due to such different flow rates, the different compositional parts can be considered as being physically separated from each other.

In various aspects, the mass spectrometer 306 can be any suitable mass spectrometer. In various instances, the mass spectrometer 306 can comprise any suitable constituent hardware 324 for measuring ion spectra of analytical samples. As a non-limiting example, the constituent hardware 324 can comprise an ion beam emitter, ion optics equipment, a mass analyzer, and an ion detector. In various cases, the ion beam emitter can receive from the chromatograph 304 a compositional part of the analytical sample and can ionize that compositional part into an ion beam. The ion beam emitter can facilitate this via any suitable ionization technique, such as electron ionization, chemical ionization, matrix assisted laser desorption ionization, electrospray ionization, photoionization, or inductively coupled plasma ionization, any of which can be implemented in a vacuum or at atmospheric pressure. In various aspects, the ion optics equipment can channel or steer the ion beam produced by the ion beam emitter through the mass analyzer and to the ion detector. Non-limiting examples of such ion optics equipment can include ion focusing lenses, ion guides, or ion deflectors. In various instances, the mass analyzer can separate or sort whatever ions are present in the ion beam according to their mass-to-charge ratios. Non-limiting examples of the mass analyzer can include quadrupole mass analyzers, time of flight mass analyzers, magnetic sector mass analyzers, electrostatic sector mass analyzers, quadrupole ion trap mass analyzers, or ion cyclotron resonance mass analyzers. In various cases, the ion detector can electronically detect or measure the relative abundances of whatever ions strike it. Non-limiting examples of the ion detector can include electron multiplier ion detectors, photomultiplier tubes, microchannel plate detectors, image charge detectors, or Faraday cup ion detectors.

In any case, when given an analytical sample, the chromatograph 304 and the mass spectrometer 306 can collectively produce an ion spectrum plotting relative abundance against mass-to-charge ratio of the various ions of the analytical sample.

In various embodiments, the scientific instrument 302 can comprise a diagnostic system 308. In various cases, the diagnostic system 308 can facilitate idle-triggered diagnostics for the scientific instrument 302.

In various aspects, the diagnostic system 308 can comprise a processor 310 (e.g., computer processing unit, microprocessor) and a non-transitory computer-readable memory 312 that is operably or operatively or communicatively connected or coupled to the processor 310. The non-transitory computer-readable memory 312 can store computer-executable instructions which, upon execution by the processor 310, can cause the processor 310 or other components of the diagnostic system 308 (e.g., access component 314, determination component 316, check component 318, result component 320) to perform one or more acts. In various embodiments, the non-transitory computer-readable memory 312 can store computer-executable components (e.g., access component 314, determination component 316, check component 318, result component 320), and the processor 310 can execute the computer-executable components.

In various embodiments, the diagnostic system 308 can comprise an access component 314. In various aspects, the access component 314 can electronically communicate or otherwise electronically interact with (e.g., transmit electronic signals to, receive electronic signals from) the chromatograph 304 or the mass spectrometer 306. Accordingly, any other components of the diagnostic system 308 can communicate or interact with the chromatograph 304 or with the mass spectrometer 306 through or via the access component 314 (e.g., the access component 314 can act as an intermediary between any other components of the diagnostic system 308 and the chromatograph 304 or the mass spectrometer 306). However, this is a mere non-limiting example. In other cases, the access component 314 can be omitted, and any other components of the diagnostic system 308 can communicate or interact directly with the chromatograph 304 or with the mass spectrometer 306.

In various embodiments, the diagnostic system 308 can comprise a determination component 316. In various aspects, as described herein, the determination component 316 can electronically determine or detect when the scientific instrument 302 (e.g., when the chromatograph 304 or the mass spectrometer 306) is in an idle-time period.

In various embodiments, the diagnostic system 308 can comprise a check component 318. In various instances, as described herein, the check component 318 can, in response to or otherwise based on detection of the idle-time period, electronically perform a diagnostic check on the chromatograph 304 or on the mass spectrometer 306.

In various embodiments, the diagnostic system 308 can comprise a result component 320. In various cases, as described herein, the result component 320 can initiate any suitable electronic actions based on the diagnostic check (e.g., can visually render notifications pertaining to the diagnostic check).

Figure 4:
FIG. 4 illustrates a block diagram of an example, non-limiting scientific instrument including an idle-time period that facilitates idle-triggered diagnostics in accordance with one or more embodiments described herein.

FIG. 4 illustrates a block diagram of an example, non-limiting scientific instrument including an idle-time period that can facilitate idle-triggered diagnostics in accordance with one or more embodiments described herein.

In various embodiments, the determination component 316 can electronically determine whether the scientific instrument 302 is currently in an idle-time period 402. In various aspects, the idle-time period 402 can be any suitable moment, interval, span, or range of time during which the chromatograph 304 and the mass spectrometer 306 are currently sitting idle, hence the term "idle". In other words, the idle-time period 402 can be any suitable chronological or temporal instant or window during which the chromatograph 304 and the mass spectrometer 306 are not currently analyzing or running an analytical sample. In various instances, the determination component 316 can electronically monitor for the idle-time period 402 in any suitable fashion or via any suitable technique.

As a non-limiting example, the determination component 316 can electronically detect the idle-time period 402, based on a temperature sensor 404 of the chromatograph 304. In particular, the temperature sensor 404 can be any suitable thermometer, thermocouple, thermistor, or thermostat that can electronically measure a current interior temperature of the chromatograph 304 (e.g., a current temperature of the oven-heated column of the chromatograph 304). In various aspects, the determination component 316 can read the current interior temperature measured by the temperature sensor 404, and the determination component 316 can detect the idle-time period 402 based on such current interior temperature.

For instance, suppose that the current interior temperature of the chromatograph 304 is equal to, or otherwise within any suitable threshold margin of, a known operating temperature value of the chromatograph 304. In such case, the determination component 316 can conclude that the scientific instrument 302 is not in the idle-time period 402. After all, the current interior temperature being that close to the known operating temperature value can indicate or suggest that the chromatograph 304 and the mass spectrometer 306 are currently analyzing or running, or are shortly about to analyze or run, an analytical sample. Suppose instead that the current interior temperature of the chromatograph 304 differs from the known operating temperature value by more than the threshold margin. In such case, the determination component 316 can conclude that the scientific instrument 302 is in the idle-time period 402. After all, the current interior temperature differing from the known operating temperature value by that much can indicate or suggest that the chromatograph 304 and the mass spectrometer 306 are not currently analyzing or running, and are not shortly about to analyze or run, an analytical sample.

In another instance, suppose that the current interior temperature of the chromatograph 304 is equal to, or otherwise within any suitable threshold margin of, a known resting or equilibrium temperature value of the chromatograph 304. In such case, the determination component 316 can conclude that the scientific instrument 302 is in the idle-time period 402. After all, the current interior temperature being that close to the known resting or equilibrium temperature value can indicate or suggest that the chromatograph 304 and the mass spectrometer 306 are not currently analyzing or running, and are not shortly about to analyze or run, an analytical sample. Suppose instead that the current interior temperature of the chromatograph 304 differs from the known resting or equilibrium temperature value by more than the threshold margin. In such case, the determination component 316 can conclude that the scientific instrument 302 is not in the idle-time period 402. After all, the current interior temperature differing from the known resting or equilibrium temperature value by that much can indicate or suggest that the chromatograph 304 and the mass spectrometer 306 are currently analyzing or running, or are shortly about to analyze or run, an analytical sample.

In other instances, the determination component 316 can determine or detect the idle-time period 402 based on a rate of change of the current interior temperature measured by the temperature sensor 404, rather than or in addition to being based on a magnitude of the current interior temperature. In particular, during analysis of any given analytical sample, the interior temperature of the chromatograph 304 (e.g., of its oven-heated column) can be incrementally ramped from any suitable starting value to any suitable ending value. Conversely, after the given analytical sample has been completely or fully analyzed, the interior temperature of the chromatograph 304 can be incrementally reset from the ending value back to the starting value, so that the chromatograph 304 is ready to analyze a subsequent analytical sample. In various aspects, such resetting or stabilization of the interior temperature of the chromatograph 304 (e.g., which can take on the order of three to ten minutes to perform) can be considered or otherwise treated as the idle-time period 402 and can be detected based on a rate of change of the current interior temperature measured by the temperature sensor 404. Indeed, if the rate of change of the current interior temperature points away from the starting value and toward the ending value, the determination component 316 can conclude that the scientific instrument 302 is currently analyzing an analytical sample and is thus not in the idle-time period 402. In contrast, if the rate of change of the current interior temperature points toward the starting value and away from the ending value, the determination component 316 can conclude that the scientific instrument 302 is currently resetting or stabilizing the chromatograph 304 rather than analyzing an analytical sample, and the determination component 316 can accordingly determine that the scientific instrument 302 is in the idle-time period 402.

As another non-limiting example, the determination component 316 can electronically detect the idle-time period 402, based on a clock 406 of the mass spectrometer 306. In particular, the clock 406 can be any suitable time-keeping device. In various aspects, the determination component 316 can read a current time indicated by the clock 406, and the determination component 316 can detect the idle-time period 402 based on such current time.

For instance, suppose that the mass spectrometer 306 is scheduled to analyze or run an analytical sample, where such analysis or run is scheduled to begin at a starting time and to cease at an ending time. If the current time measured by the clock 406 is between the starting time and the ending time (e.g., is later than the starting time and earlier than the ending time), then the determination component 316 can infer or conclude that the chromatograph 304 and the mass spectrometer 306 are currently analyzing or running the analytical sample as scheduled. Thus, the determination component 316 can conclude that the scientific instrument 302 is not currently in the idle-time period 402. Furthermore, if the current time measured by the clock 406 is earlier than the starting time but within any suitable threshold margin of the starting time, then the determination component 316 can infer or conclude that the chromatograph 304 and the mass spectrometer 306 are shortly or imminently about to analyze or run the analytical sample as scheduled. So, the determination component 316 can conclude that the scientific instrument 302 is not currently in the idle-time period 402. Now, if the current time measured by the clock 406 is more than the threshold margin earlier than the starting time, then the determination component 316 can infer or conclude that the chromatograph 304 and the mass spectrometer 306 are not shortly or imminently about to analyze or run the analytical sample as scheduled. Thus, the determination component 316 can conclude that the scientific instrument 302 is currently in the idle-time period 402. Moreover, if the current time measured by the clock 406 is later than the ending time, then the determination component 316 can infer or conclude that the chromatograph 304 and the mass spectrometer 306 have already analyzed or run the analytical sample as scheduled. So, the determination component 316 can conclude that the scientific instrument 302 is currently in the idle-time period 402.

In other instances, the determination component 316 can determine or detect the idle-time period 402 based on comparing the current time indicated by the clock 406 to an operational history of the mass spectrometer 306 (e.g., to a log that shows previous times at which samples were analyzed and other previous times at which samples were not analyzed), rather than or in addition to comparing the current time to future scheduled starting and ending times.

In any case, the idle-time period 402 can be any suitable span or window of time during which the scientific instrument 302 is not currently analyzing or running an analytical sample. In some instances, the idle-time period 402 can, as mentioned above, be a stabilization time in between consecutive runs of the scientific instrument 302. In other instances, the idle-time period 402 can be an extended stabilization time in between consecutive runs of the scientific instrument 302, where an extended stabilization time can be any stabilization time that is buffered before or after by the insertion of additional time that is not spent on running or analyzing an analytical sample and that is not spent on stabilization. For example, suppose that the scientific instrument 302 consumes a total of $x+y_1+y_2$ seconds between completion of a first sample run and beginning of a second sample run, for any suitable positive integers $x$, $y_1$, and $y_2$. Here, x can represent the number of seconds consumed by the scientific instrument 302 during stabilization (e.g., of the oven of the chromatograph 304); $y_1$ can represent a first buffer of time inserted after completion of the first sample run but before such stabilization; and $y_2$ can represent a second buffer of time inserted after such stabilization but before beginning the second sample run. In such case, $x+y_1+y_2$ can be considered as an extended stabilization time of the scientific instrument 302, and the idle-time period 402 can be an entirety, or any portion, of such extended stabilization time.

Figure 5:
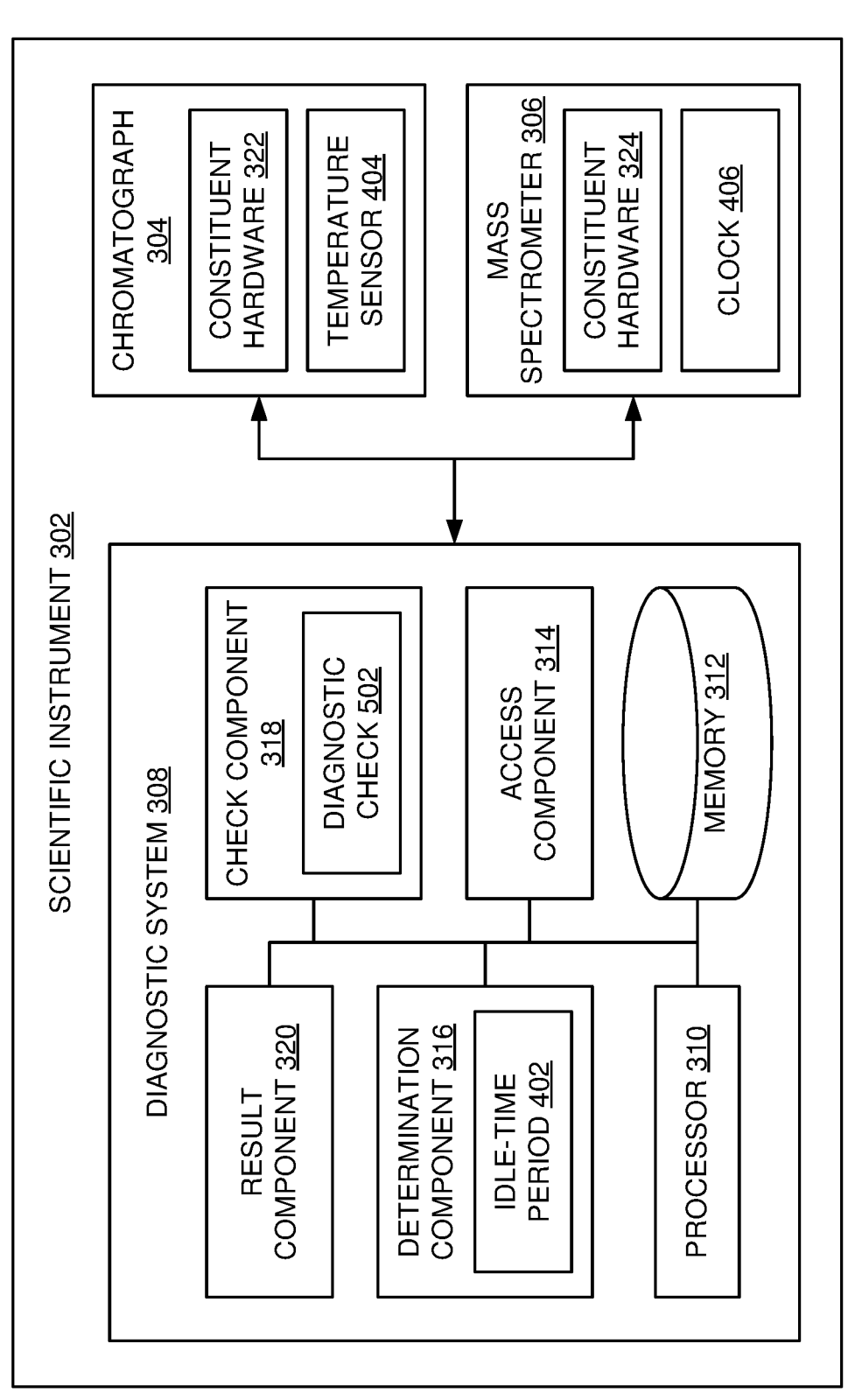
FIG. 5 illustrates a block diagram of an example, non-limiting scientific instrument including a diagnostic check that facilitates idle-triggered diagnostics in accordance with one or more embodiments described herein.

FIG. 5 illustrates a block diagram of an example, non-limiting scientific instrument including a diagnostic check that can facilitate idle-triggered diagnostics in accordance with one or more embodiments described herein.

In various embodiments, the check component 318 can, in response to the idle-time period 402 not being detected by the determination component 316 (e.g., in response to the determination component 316 determining that the scientific instrument 302 is not currently in the idle-time period 402), refrain from taking or initiating any suitable actions or operations. However, in various aspects, the check component 318 can, in response to the idle-time period 402 being detected by the determination component 316 (e.g., in response to the determination component 316 determining that the scientific instrument 302 is currently in the idle-time period 402), electronically perform a diagnostic check 502 on the chromatograph 304 or on the mass spectrometer 306. Accordingly, the diagnostic check 502 can be considered as being triggered or caused by detection or determination of the idle-time period 402. In various cases, the diagnostic check 502 can be any suitable automated check that can evaluate a health, functionality, or operability of any of the constituent hardware 322 or of any of the constituent hardware 324. In other words, the diagnostic check 502 can evaluate whether or not any of the constituent hardware 322 or any of the constituent hardware 324 are operating within respective defined tolerances or ranges. Various non-limiting aspects as described with respect to FIG. 6.

Figure 6:
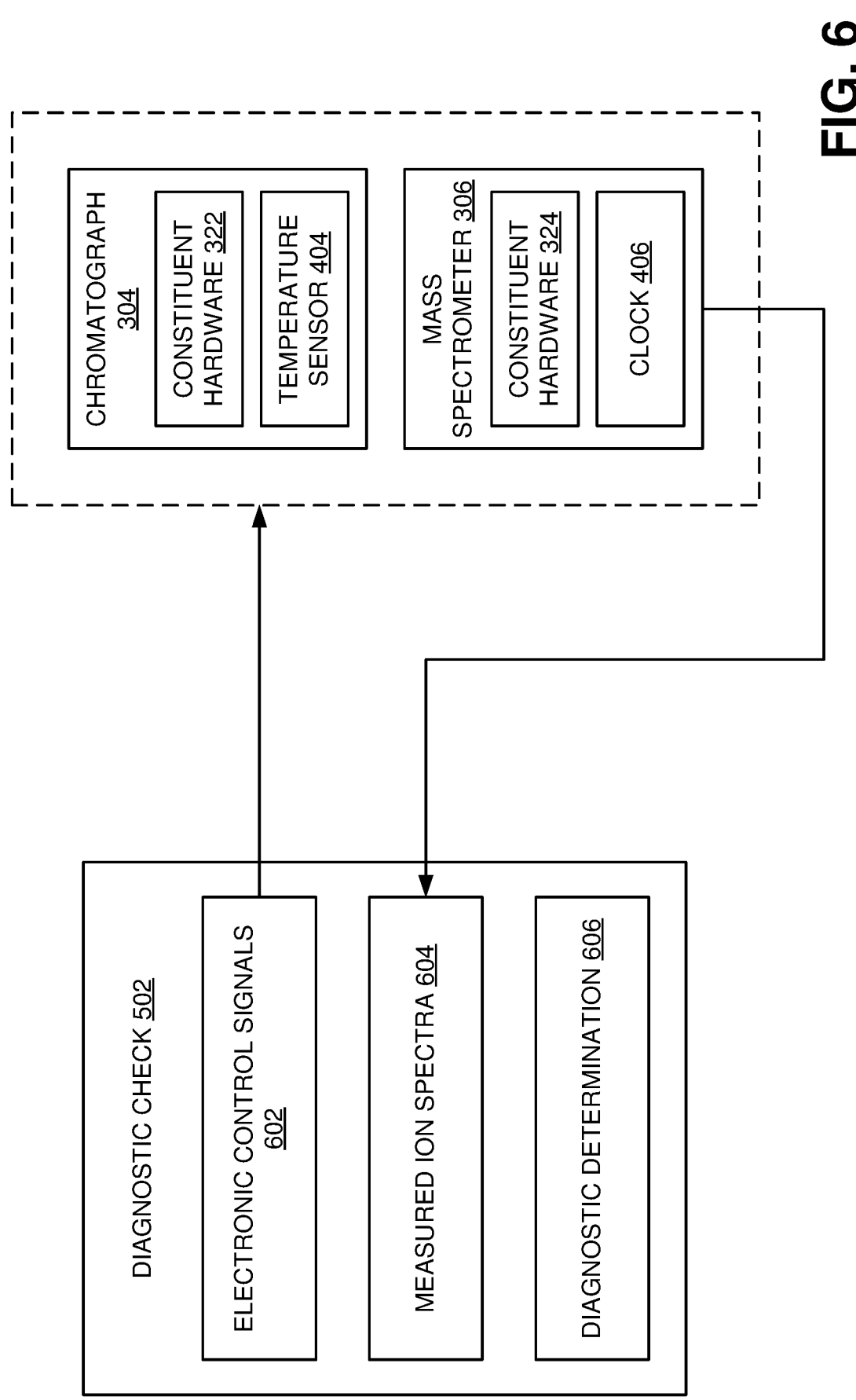
FIG. 6 illustrates an example, non-limiting block diagram of an idle-triggered diagnostic check in accordance with one or more embodiments described herein.

FIG. 6 illustrates an example, non-limiting block diagram of an idle-triggered diagnostic check in accordance with one or more embodiments described herein.

In various embodiments, the diagnostic check 502 can comprise applying, by the check component 318, one or more electronic control signals 602 to the chromatograph 304 or to the mass spectrometer 306. In various aspects, the one or more electronic control signals 602 can be considered as electronic commands or electronic instructions that can be received by the chromatograph 304 or by the mass spectrometer 306 so as to activate, deactivate, actuate, modulate, or otherwise influence any of the constituent hardware 322 or any of the constituent hardware 324.

In various instances, the ion detector of the mass spectrometer 306 can capture or generate one or more measured ion spectra 604 which can be considered as resulting from, precipitating from, being caused by, or otherwise relating to the one or more electronic control signals 602. In various cases, the diagnostic check 502 can comprise recording, logging, or otherwise receiving, by the check component 318, the one or more measured ion spectra 604.

In various aspects, the diagnostic check 502 can comprise generating a diagnostic determination 606, based on the one or more measured ion spectra 604. In some instances, the check component 318 can generate the diagnostic determination 606, by comparing the one or more measured ion spectra 604 with each other. In other instances, the check component 318 can generate the diagnostic determination 606, by comparing the one or more measured ion spectra 604 with any suitable thresholds. In any case, if the one or more measured ion spectra 604 relate to each other or to any applicable thresholds in an expected fashion, the diagnostic determination 606 can indicate that the chromatograph 304 or the mass spectrometer 306 is functioning healthily or otherwise as it is expected to function. In contrast, if the one or more measured ion spectra 604 instead relate to each other or to any applicable thresholds in an unexpected fashion, the diagnostic determination 606 can indicate that the chromatograph 304 or the mass spectrometer 306 is not functioning healthily or otherwise as it is expected to function.

As a non-limiting example, the diagnostic check 502 can be a lens connection check for the mass spectrometer 306. In particular, as mentioned above, the constituent hardware 324 can comprise an ion focusing lens. In various aspects, the one or more electronic control signals 602 can cause the ion beam emitter of the mass spectrometer 306 to become activated, so as to emit an ion beam towards the ion focusing lens. Moreover, the one or more electronic control signals 602 can be expected, purported, or supposed to cause the ion focusing lens of the mass spectrometer 306 to transition, shift, or otherwise convert from a pass state (e.g., a state that allows an incident ion beam to pass through the ion focusing lens) to a block state (e.g., a state that prevents an incident ion beam from passing through the ion focusing lens). In various instances, the ion beam emitted by the ion beam emitter can comprise any given ion. In various cases, the one or more measured ion spectra 604 can indicate a first abundance of the given ion, where the first abundance can be measured by the ion detector when the ion focusing lens is purportedly in, ostensibly in, or otherwise supposed to be in the pass state. Likewise, in various aspects, the one or more measured ion spectra 604 can indicate a second abundance of the given ion, where the second abundance can be measured by the ion detector when the ion focusing lens is purportedly in, ostensibly in, or otherwise supposed to be in the block state. Now, if the ion focusing lens were functioning correctly, it can be expected that the second abundance would be lesser than the first abundance by more than a threshold margin. Accordingly, if this expectation is satisfied (e.g., if the second abundance is lesser than the first abundance by more than the threshold margin), then the diagnostic determination 606 can indicate that the ion focusing lens is operating healthily (e.g., is operating as expected or otherwise according to its defined tolerance). In contrast, if this expectation is not satisfied (e.g., if the second abundance is not lesser than the first abundance by more than the threshold margin), then the diagnostic determination 606 can indicate that the ion focusing lens is operating unhealthily (e.g., is not operating as expected or otherwise according to its defined tolerance). In particular, if the second abundance is not lesser than the first abundance by more than the threshold margin, the diagnostic determination 606 can specifically indicate that the ion focusing lens is or seems to be electrically disconnected or electronically floating.

As another non-limiting example, the diagnostic check 502 can be a lens charging check for the mass spectrometer 306. In particular, as mentioned above, the constituent hardware 324 can comprise an ion focusing lens. In various aspects, the one or more electronic control signals 602 can cause the ion beam emitter of the mass spectrometer 306 to become activated, so as to charge the ion focusing lens with an ion beam. In various instances, the ion beam emitted by the ion beam emitter can comprise any particular ion. In various cases, the one or more measured ion spectra 604 can indicate a first abundance of the particular ion, where the first abundance can be measured by the ion detector prior to charging of the ion focusing lens. Likewise, in various aspects, the one or more measured ion spectra 604 can indicate a second abundance of the particular ion, where the second abundance can be measured by the ion detector after, subsequent to, or during charging of the ion focusing lens. Now, if the ion focusing lens were functioning correctly, it can be expected that the first abundance and the second abundance would differ by less than a threshold margin. Accordingly, if this expectation is satisfied (e.g., if the first abundance and the second abundance differ by less than the threshold margin), then the diagnostic determination 606 can indicate that the ion focusing lens is operating healthily (e.g., is operating as expected or otherwise according to its defined tolerance). In contrast, if this expectation is not satisfied (e.g., if the first abundance and the second abundance differ by more than the threshold margin), then the diagnostic determination 606 can indicate that the ion focusing lens is operating unhealthily (e.g., is not operating as expected or otherwise according to its defined tolerance). In particular, if the first abundance and the second abundance differ by more than the threshold margin, the diagnostic determination 606 can specifically indicate that the ion focusing lens is or seems to be contaminated with an ion burn.

As yet another non-limiting example, the diagnostic check 502 can be an ion detector background noise check for the mass spectrometer 306. In particular, as mentioned above, the constituent hardware 324 can comprise an ion detector. In various aspects, the one or more electronic control signals 602 can cause the ion beam emitter of the mass spectrometer 306 to become deactivated, so as to not emit any ion beam. In various cases, the one or more measured ion spectra 604 can indicate an abundance of any given ion, where that abundance can be measured by the ion detector after or subsequent to deactivation of the ion beam emitter. Now, if the ion detector were functioning correctly, it can be expected that the abundance of the given ion would be less than any suitable threshold (e.g., indeed, if the ion beam emitter is deactivated, then it can be expected to measure zero abundance of the given ion; if non-zero abundance of the given ion is measured, this can indicate the presence of electronic interference affecting the ion detector, where such interference can be caused by poorly shielded electrodes or wires). Accordingly, if this expectation is satisfied (e.g., if the abundance of the given ion is less than the threshold), then the diagnostic determination 606 can indicate that the ion detector is operating healthily (e.g., is operating as expected or according to its defined tolerance). In contrast, if this expectation is not satisfied (e.g., if the abundance of the given ion is greater than the threshold), then the diagnostic determination 606 can indicate that the ion focusing lens is operating unhealthily (e.g., is not operating as expected or otherwise according to its defined tolerance). In particular, if the abundance of the given ion is greater than the threshold, the diagnostic determination 606 can specifically indicate that the ion detector is or seems to be excessively noisy (e.g., is picking up electronic interference that can be mistaken for ion signals).

Note that an ion detector background noise check can be alternatively performed by activating the ion beam emitter of the mass spectrometer 306 and by setting an ion focusing lens of the mass spectrometer 306 to a block state.

As even another non-limiting example, the diagnostic check 502 can be a leak check for the chromatograph 304. In particular, as mentioned above, the constituent hardware

322 can comprise carrier fluid valves or pumps. In various aspects, the one or more electronic control signals 602 can cause the carrier fluid valves or pumps to become activated (e.g., opened), so as to permit or cause the carrier fluid to flow through the chromatograph 304. In various instances, any particular ion can be associated with a leak between the chromatograph 304 and the mass spectrometer 306. For example, the particular ion can be an oxygen ion, which can be considered as associated with air leaks between the chromatograph 304 and the mass spectrometer 306. As another example, the particular ion can instead be a constituent compositional component of the carrier fluid, which can be considered as associated with carrier fluid leaks between the chromatograph 304 and the mass spectrometer 306. In any case, the one or more measured ion spectra 604 can indicate an abundance of the particular ion, where that abundance can be measured by the ion detector after or subsequent to activation of the carrier fluid valves or pumps. Now, if the chromatograph 304 were functioning correctly, it can be expected that the abundance of the particular ion would be lesser than any suitable threshold. Accordingly, if this expectation is satisfied (e.g., if the abundance of the particular ion is lesser than the threshold), then the diagnostic determination 606 can indicate that the chromatograph 304 is operating healthily (e.g., is operating as expected or according to its defined tolerance). In contrast, if this expectation is not satisfied (e.g., if the abundance of the particular ion is greater than the threshold), then the diagnostic determination 606 can indicate that the chromatograph 304 is operating unhealthily (e.g., is not operating as expected or otherwise according to its defined tolerance). In particular, if the abundance of the particular ion is greater than the threshold, the diagnostic determination 606 can specifically indicate that there is or seems to be a leak between the chromatograph 304 and the mass spectrometer 306.

The above several paragraphs present mere non-limiting examples of the diagnostic check 502. In various embodiments, the diagnostic check 502 can be any other suitable type of check that can reveal an operating health of any of the constituent hardware 322 or of any of the constituent hardware 324 and that can be facilitated by considering the one or more measured ion spectra 604. As a non-limiting example, the diagnostic check 502 can be an ion collision check, which can involve: modulating or adjusting (e.g., via 602) an ion fragmentation pathway of the mass spectrometer 306; measuring by the ion detector resultant ion spectra (e.g., 604) before or after such modulation or alteration; and determining whether such resultant ion spectra meet expectations. As another non-limiting example, the diagnostic check 502 can be an electrospray stability check, which can involve: modulating or adjusting (e.g., via 602) a position, voltage, or fluid flow rate of an electrosprayer of the chromatograph 304; measuring by the ion detector resultant ion spectra (e.g., 604) before or after such modulation or alteration; and determining whether such resultant ion spectra meet expectations. As even another non-limiting example, the diagnostic check 502 can be a calibrant solution check, which can involve: emitting an ion beam using a calibrant solution of the chromatograph 304; measuring by the ion detector resultant ion spectra (e.g., 604) corresponding to the calibrant solution; and determining whether such resultant ion spectra meet expectations.

So far, various embodiments have been described in which the diagnostic check 502 utilizes or leverages the one or more measured ion spectra 604 captured by the ion detector of the mass spectrometer 306. However, this is a mere non-limiting example. More generally, the diagnostic check 502 can involve capturing, from any suitable electronic sensors of the chromatograph 304 or of the mass spectrometer 306 (e.g., temperature sensors, pressure sensors, moisture sensors, strain gauges, voltage sensors, current sensors), one or more electronic readback signals that result from or otherwise relate to the one or more electronic control signals 602, and the diagnostic determination 606 can be based on whether or not those one or more electronic readback signals meet expectations or are otherwise within respective defined tolerances. As a non-limiting example, the diagnostic check 502 can be a filament check, which can involve: measuring an emission current across a filament of the ion beam emitter; and determining whether such emission current meets expectations. As another non-limiting example, the diagnostic check 502 can be a communication check, which can involve: measuring transmission speeds of electronic data packets between digital devices within the chromatograph 304 or the mass spectrometer 306; and determining whether such transmission speeds meet expectations. As yet another non-limiting example, the diagnostic check 502 can be a transfer tube check, which can involve: measuring a pressure drop across a transfer tube atmospheric pressure interface of the mass spectrometer 306; and determining whether such pressure drop meets expectations. As still another non-limiting example, the diagnostic check 502 can be a polarity switching check, which can involve: switching electronic polarities of various electronic control signals received by the chromatograph 304 or by the mass spectrometer 306; measuring settling times of the electronic control signals after such switching; and determining whether such settling times meet expectations.

In various embodiments, the result component 320 of the diagnostic system 308 can electronically perform or initiate any suitable actions, based upon the diagnostic check 502.

As a non-limiting example, the result component 320 can electronically transmit the diagnostic determination 606 to any suitable computing device.

As another non-limiting example, the result component 320 can electronically render, on any suitable electronic display or screen of the scientific instrument 302, the diagnostic determination 606.

As yet another non-limiting example, in response to the diagnostic determination 606 indicating that the chromatograph 304 or the mass spectrometer 306 is operating unhealthily or otherwise not as expected, then the result component 320 can electronically render on the electronic display a notification indicating that maintenance of the chromatograph 304 or of the mass spectrometer 306 is warranted. In particular, in response to the diagnostic determination 606 indicating that the chromatograph 304 or the mass spectrometer 306 is operating unhealthily or otherwise not as expected, the result component 320 can electronically identify any suitable maintenance task that corresponds to the diagnostic check 502 and can electronically recommend or schedule the maintenance task for performance on the chromatograph 304 or on the mass spectrometer 306. For instance, suppose that the diagnostic check 502 is a lens charging check for a specific ion focusing lens of the mass spectrometer 306. In such case, the result component 320 can recommend or schedule cleaning or decontamination for that specific ion focusing lens.

FIG. 7 illustrates a flow diagram of an example, non-limiting computer-implemented method 700 that can facilitate idle-triggered diagnostics in accordance with one or more embodiments described herein. In various cases, the diagnostic system 308 can facilitate the computer-implemented method 700.

In various embodiments, act 702 can include measuring, by a scientific instrument (e.g., via 316 installed on 302) comprising a mass spectrometer (e.g., 306) and a chromatograph (e.g., 304), a temperature indicated by a temperature sensor (e.g., 404) of the chromatograph or a time indicated by a clock (e.g., 306) of the mass spectrometer.

In various aspects, act 704 can include determining, by the scientific instrument (e.g., via 316 installed on 302), whether the temperature (or a rate of change thereof) or the time indicate that the scientific instrument is in an idle-time period (e.g., 402). If not (e.g., if the temperature or the time does not indicate the idle-time period), the computer-implemented method 700 can proceed back to act 702. If so (e.g., if the temperature or the time does indicate the idle-time period), the computer-implemented method 700 can proceed to act 706.

As explained above, the idle-time period can, in some cases, be a period during which the scientific instrument is stabilizing or resetting itself for a subsequent sample run.

In various instances, act 706 can include conducting, by the scientific instrument (e.g., via 318 installed on 302), a diagnostic check (e.g., 502) on constituent hardware (e.g., 324 or 322) of the mass spectrometer or of the chromatograph.

In various cases, act 708 can include determining, by the scientific instrument (e.g., via 320 installed on 302), whether the diagnostic check indicates that the constituent hardware is not operating correctly. If not (e.g., if the constituent hardware is operating correctly or healthily), the computer-implemented method 700 can proceed back to act 702. If so (e.g., if the constituent hardware is not operating correctly or healthily), the computer-implemented method 700 can proceed to act 710.

In various aspects, act 710 can include transmitting or rendering, by the scientific instrument (e.g., via 320 installed on 302), a notification indicating that maintenance of the constituent hardware is warranted.

Figure 8:
FIG. 8 illustrates a block diagram of an example, non-limiting scientific instrument including a tuning operation that facilitates idle-triggered diagnostics in accordance with one or more embodiments described herein.

FIG. 8 illustrates a block diagram of an example, non-limiting scientific instrument including a tuning operation that can facilitate idle-triggered diagnostics in accordance with one or more embodiments described herein.

In various embodiments, as shown, the check component 318 can perform not just the diagnostic check 502 based on detection of the idle-time period 402, but also can perform a tuning operation 802 based on detection of the idle-time period 402. As mentioned above, the diagnostic check 502 can evaluate a health, functionality, or operability of any of the constituent hardware 322 or of any of the constituent hardware 324. In contrast, the tuning operation 802 can calibrate to a desired value any suitable configurable parameter of any of the constituent hardware 322 or of any of the constituent hardware 324. As a non-limiting example, a configurable parameter can be a voltage ramp rate of any piece of constituent hardware of the chromatograph 304 or of the mass spectrometer 306. As another non-limiting example, a configurable parameter can be a detector gain setting of the ion detector of the mass spectrometer 306. As still another non-limiting example, a configurable parameter can be a mass resolution or a mass range of the ion detector of the mass spectrometer 306. As even another non-limiting example, a configurable parameter can be a sensitivity setting of any piece of constituent hardware of the chromatograph 304 or of the mass spectrometer 306.

In other words, the tuning operation 802 can be considered as calibration of configurable settings of the chromatograph 304 or of the mass spectrometer 306 that are overtly or explicitly controllable (e.g., detector gain, detector resolution), whereas the diagnostic check 502 can instead be considered as evaluation of measurable characteristics exhibited by the chromatograph 304 or by the mass spectrometer 306 that are not overtly or explicitly controllable (e.g., lens contamination, lens disconnection, carrier fluid leak).

In various embodiments, there can be interplay between the diagnostic check 502 and the tuning operation 802, such that they can interact with or otherwise inform each other. Such interplay or interaction can be considered as enhancing or deepening the self-monitoring abilities of the scientific instrument 302.

As a non-limiting example, the tuning operation 802 can be after or subsequent to the diagnostic check 502, such that the tuning operation 802 can be considered as an automated attempt to fix, remedy, or rectify whatever problem (if any) is uncovered by the diagnostic check 502. For instance, as mentioned above, the check component 318 can perform the diagnostic check 502 in response to detection of the idle-time period 402. In various cases, the check component 318 can, in response to the diagnostic check 502 indicating that a particular constituent hardware of the chromatograph 304 or of the mass spectrometer 306 is operating unhealthily, perform the tuning operation 802 on that particular constituent hardware so as to try to ameliorate such unhealthy operation (e.g., if the diagnostic check 502 indicates that the ion detector of the mass spectrometer 306 is operating outside of its defined tolerances, the tuning operation 802 can involve tuning or calibrating a gain, resolution, or sensitivity of the ion detector in an attempt to rectify such unhealthy operation).

As another non-limiting example, the tuning operation 802 can be before or prior to the diagnostic check 502, such that the diagnostic check 502 can be considered as an automated verification or validation of the tuning operation 802. For instance, in various aspects, the check component 318 can perform the tuning operation 802 in response to detection of the idle-time period 402. In various cases, the check component 318 can, in response to completion of the tuning operation 802, perform the diagnostic check 502. If the diagnostic check 502 indicates that the chromatograph 304 or the mass spectrometer 306 is operating healthily, the check component 318 can conclude or determine that the tuning operation 802 was successful or otherwise can be trusted. In contrast, if the diagnostic check 502 instead indicates that the chromatograph 304 or the mass spectrometer 306 is operating unhealthily, the check component 318 can conclude or determine that the tuning operation 802 was unsuccessful or otherwise cannot be trusted (e.g., the tuning operation 802 can calibrate a resolution of the ion detector of the mass spectrometer 306; if the diagnostic check 502 indicates that an ion focusing lens of the mass spectrometer 306 was electrically disconnected during such calibration, such calibration might have been thrown off or otherwise negatively influenced by such electrical disconnect).

As even another non-limiting example, the tuning operation 802 can be before or prior to the diagnostic check 502, such that the diagnostic check 502 can be considered as an automated search for a potential cause of any tuning irregularity. For instance, in various aspects, the check component 318 can perform the tuning operation 802 in response to detection of the idle-time period 402. In various cases, suppose that an anomaly is encountered during the tuning operation 802. In other words, suppose that the chromatograph 304 or the mass spectrometer 306 exhibits any unusual, strange, or otherwise unexpected behavior during the tuning operation 802. In various aspects, the check component 318 can, in response to such anomaly, perform the diagnostic check 502. If the diagnostic check 502 indicates that a particular constituent hardware of the chromatograph 304 or the mass spectrometer 306 is operating unhealthily, the check component 318 can conclude or determine that damage or degradation of the particular constituent hardware caused or otherwise was responsible for the anomaly that occurred during the tuning operation 802 (e.g., during the tuning operation 802, a flat detector gain curve can be encountered, but a polynomial detector gain curve can have been expected; if the diagnostic check 502 indicates that an ion focusing lens of the mass spectrometer 306 is electrically disconnected, it can be concluded that such electrical disconnect at least partially caused the flat detector gain curve).

FIGS. 9-14 illustrate flow diagrams of example, non-limiting computer-implemented methods 900, 1100, and 1300 that can facilitate idle-triggered diagnostics in conjunction with tuning operations in accordance with one or more embodiments described herein.

Figure 10:
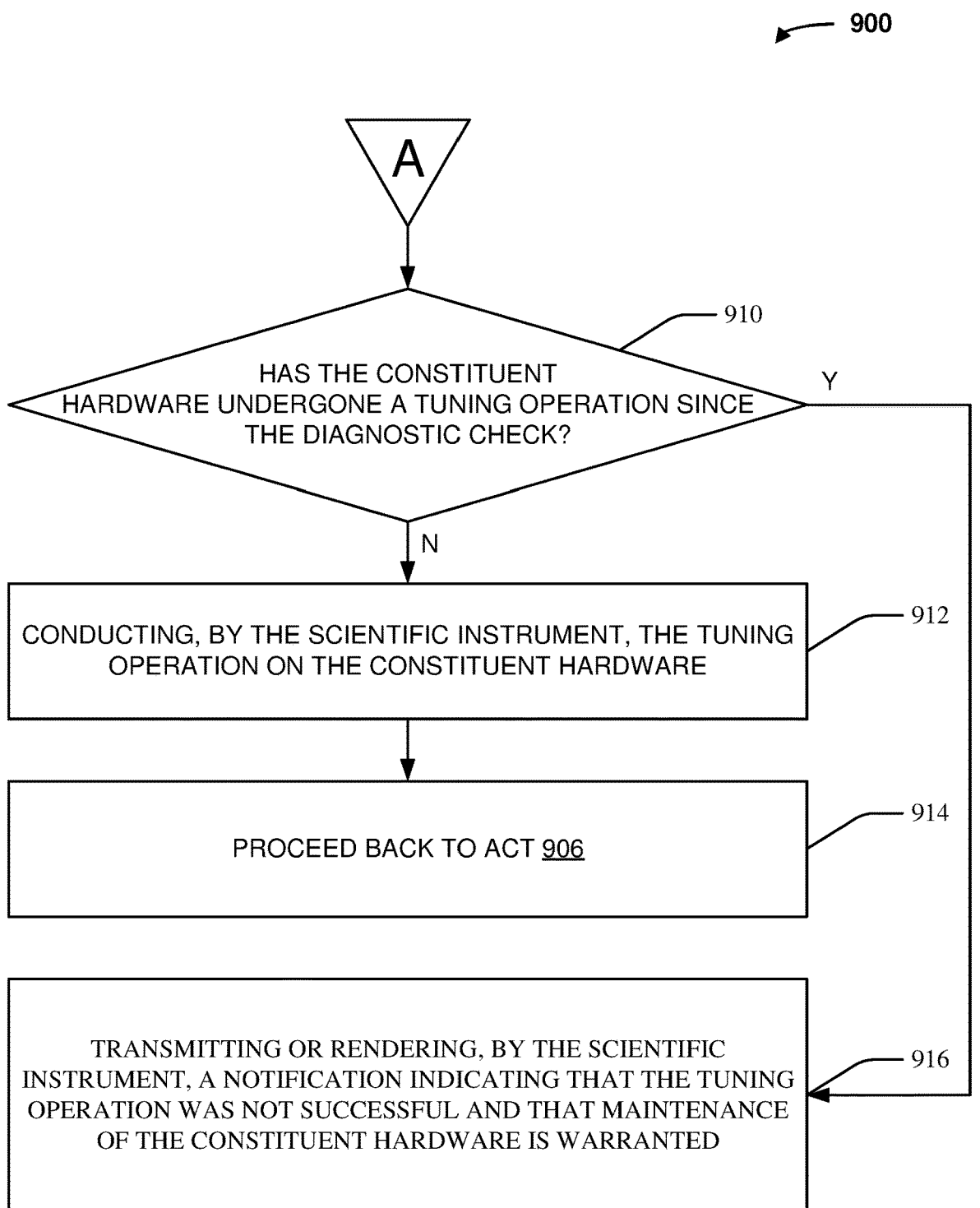

First, consider the computer-implemented method 900 shown in FIGS. 9-10. In various cases, the diagnostic system 308 can facilitate the computer-implemented method 900.

In various embodiments, act 902 can include measuring, by a scientific instrument (e.g., via 316 installed on 302) comprising a mass spectrometer (e.g., 306) and a chromatograph (e.g., 304), a temperature indicated by a temperature sensor (e.g., 404) of the chromatograph or a time indicated by a clock (e.g., 306) of the mass spectrometer.

In various aspects, act 904 can include determining, by the scientific instrument (e.g., via 316 installed on 302), whether the temperature or the time indicate that the scientific instrument is in an idle-time period (e.g., 402). If not (e.g., if the temperature or the time does not indicate the idle-time period), the computer-implemented method 900 can proceed back to act 902. If so (e.g., if the temperature or the time does indicate the idle-time period), the computer-implemented method 900 can proceed to act 906.

In various instances, act 906 can include conducting, by the scientific instrument (e.g., via 318 installed on 302), a diagnostic check (e.g., 502) on constituent hardware (e.g., 324 or 322) of the mass spectrometer or of the chromatograph.

In various cases, act 908 can include determining, by the scientific instrument (e.g., via 320 installed on 302), whether the diagnostic check indicates that the constituent hardware is not operating correctly. If not (e.g., if the constituent hardware is operating correctly or healthily), the computer-implemented method 900 can proceed back to act 902. If so (e.g., if the constituent hardware is not operating correctly or healthily), the computer-implemented method 900 can proceed to act 910.

In various aspects, act 910 can include determining, by the scientific instrument (e.g., via 318 installed on 302), whether the constituent hardware has undergone a tuning operation (e.g., 802) since performance of the diagnostic check. If not (e.g., if the constituent hardware has not yet undergone a tuning operation since performance of the diagnostic check), the computer-implemented method 900 can proceed to act 912. If so (e.g., if the constituent hardware has already undergone a tuning operation since performance of the diagnostic check), the computer-implemented method 900 can proceed to act 916.

In various instances, act 912 can include conducting, by the scientific instrument (e.g., via 318 installed on 302), the tuning operation on the constituent hardware.

In various cases, act 914 can include proceeding back to act 906.

In various aspects, act 916 can include transmitting or rendering, by the scientific instrument (e.g., via 320 installed on 302), a notification indicating that the tuning operation was not successful (e.g., did not succeed at curing whatever unhealthy operation was detected by the diagnostic check), and further indicating that maintenance of the constituent hardware is warranted.

Figure 11:
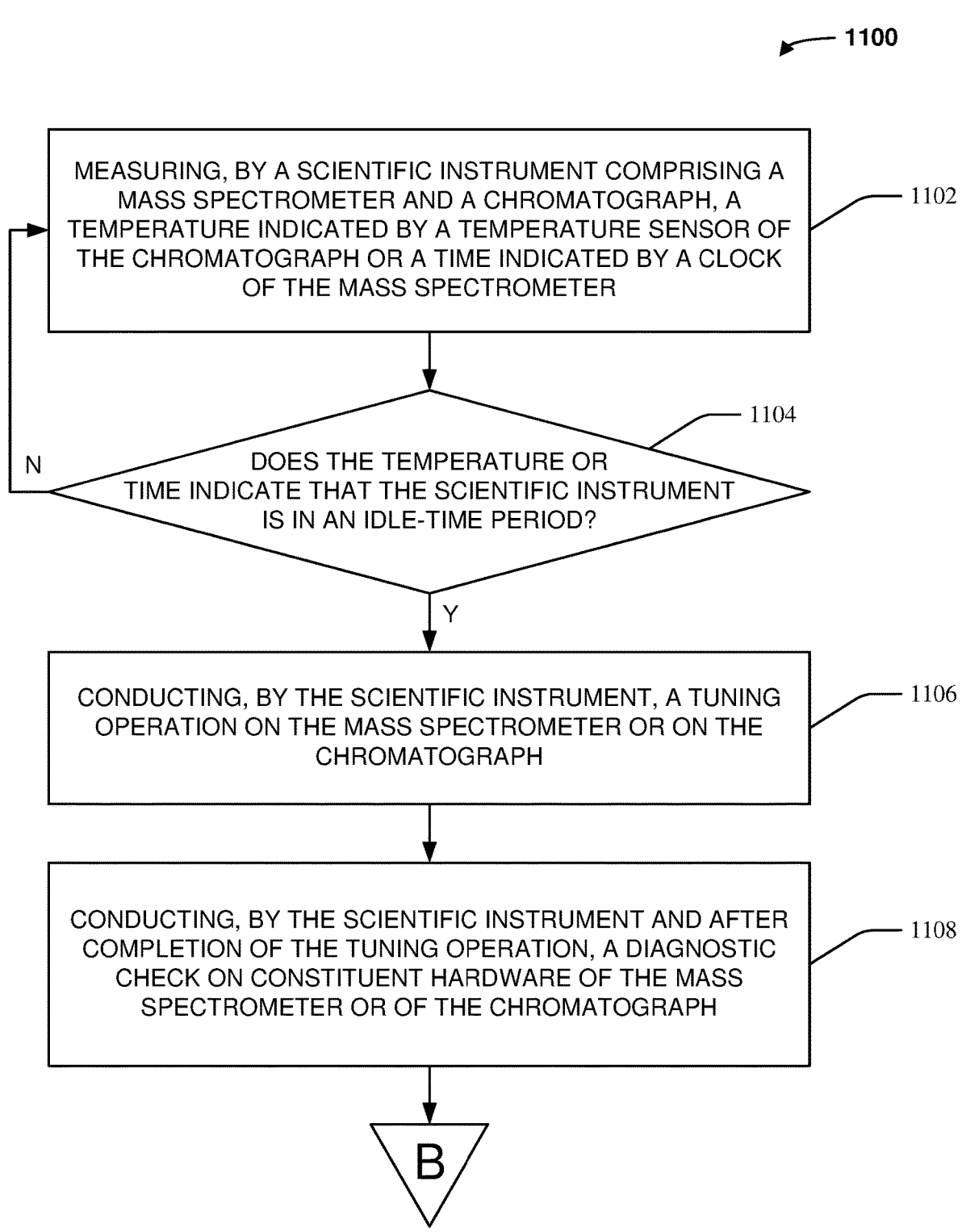
Figure 12:
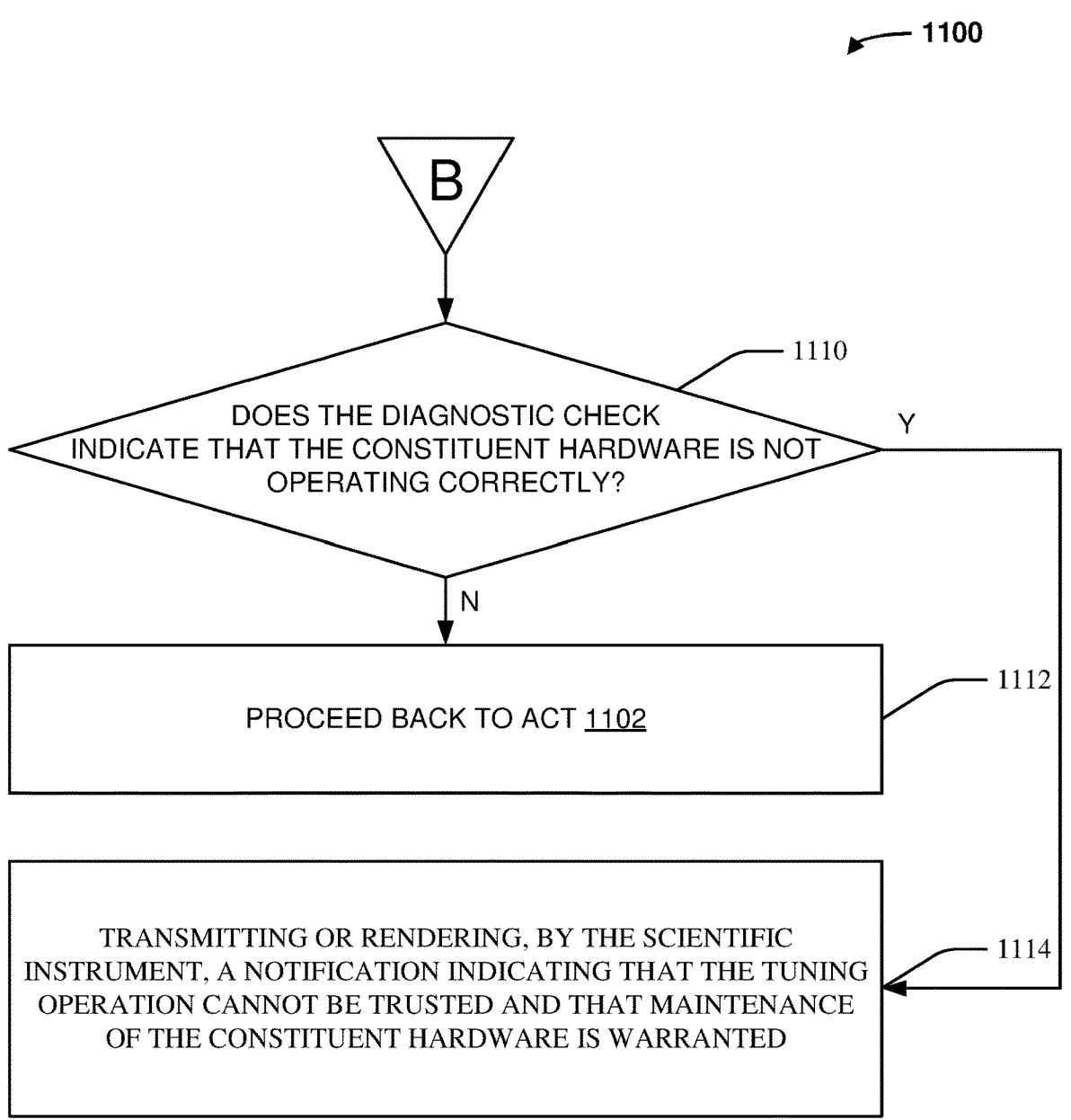

Next, consider the computer-implemented method 1100 shown in FIGS. 11-12. In various cases, the diagnostic system 308 can facilitate the computer-implemented method 1100.

In various embodiments, act 1102 can include measuring, by a scientific instrument (e.g., via 316 installed on 302) comprising a mass spectrometer (e.g., 306) and a chromatograph (e.g., 304), a temperature indicated by a temperature sensor (e.g., 404) of the chromatograph or a time indicated by a clock (e.g., 306) of the mass spectrometer.

In various aspects, act 1104 can include determining, by the scientific instrument (e.g., via 316 installed on 302), whether the temperature or the time indicate that the scientific instrument is in an idle-time period (e.g., 402). If not (e.g., if the temperature or the time does not indicate the idle-time period), the computer-implemented method 1100 can proceed back to act 1102. If so (e.g., if the temperature or the time does indicate the idle-time period), the computer-implemented method 1100 can proceed to act 1106.

In various instances, act 1106 can include conducting, by the scientific instrument (e.g., via 318 installed on 302), a tuning operation (e.g., 802) on constituent hardware (e.g., 324 or 322) of the mass spectrometer or of the chromatograph.

In various cases, act 1108 can include conducting, by the scientific instrument (e.g., via 318 installed on 302) and after completion of the tuning operation, a diagnostic check (e.g., 502) on constituent hardware (e.g., 324 or 322) of the mass spectrometer or of the chromatograph.

In various aspects, act 1110 can include determining, by the scientific instrument (e.g., via 320 installed on 302), whether the diagnostic check indicates that the constituent hardware is not operating correctly. If not (e.g., if the constituent hardware is operating correctly or healthily), the computer-implemented method 1100 can proceed, as shown by numeral 1112, back to act 1102. If so (e.g., if the constituent hardware is not operating correctly or healthily), the computer-implemented method 1100 can proceed to act 1114.

In various instances, act 1114 can include transmitting or rendering, by the scientific instrument (e.g., via 320 installed on 302), a notification indicating that the tuning operation cannot be trusted (e.g., might have been thrown off by the unhealthy operation of the constituent hardware), and further indicating that maintenance of the constituent hardware is warranted.

Now, consider the computer-implemented method 1300 shown in FIGS. 13-14. In various cases, the diagnostic system 308 can facilitate the computer-implemented method 1300.

In various embodiments, act 1302 can include measuring, by a scientific instrument (e.g., via 316 installed on 302) comprising a mass spectrometer (e.g., 306) and a chromatograph (e.g., 304), a temperature indicated by a temperature sensor (e.g., 404) of the chromatograph or a time indicated by a clock (e.g., 306) of the mass spectrometer.

In various aspects, act 1304 can include determining, by the scientific instrument (e.g., via 316 installed on 302), whether the temperature or the time indicate that the scientific instrument is in an idle-time period (e.g., 402). If not (e.g., if the temperature or the time does not indicate the idle-time period), the computer-implemented method 1300 can proceed back to act 1302. If so (e.g., if the temperature or the time does indicate the idle-time period), the computer-implemented method 1300 can proceed to act 1306.

In various instances, act 1306 can include conducting, by the scientific instrument (e.g., via 318 installed on 302), a tuning operation (e.g., 802) on constituent hardware (e.g., 324 or 322) of the mass spectrometer or of the chromatograph.

In various cases, act 1308 can include determining, by the scientific instrument (e.g., via 318 installed on 302), whether an anomaly (e.g., irregularly-shaped tuning curve) was encountered during the tuning operation. If not (e.g., if no anomaly was encountered), the computer-implemented method 1300 can proceed back to act 1302. If so (e.g., if an anomaly was encountered), the computer-implemented method 1300 can proceed to act 1310.

In various aspects, act 1310 can include conducting, by the scientific instrument (e.g., via 318 installed on 302), a diagnostic check (e.g., 502) on constituent hardware (e.g., 324 or 322) of the mass spectrometer or of the chromatograph.

In various aspects, act 1312 can include determining, by the scientific instrument (e.g., via 320 installed on 302), whether the diagnostic check indicates that the constituent hardware is not operating correctly. If not (e.g., if the constituent hardware is operating correctly or healthily), the computer-implemented method 1300 can proceed to act 1314. If so (e.g., if the constituent hardware is not operating correctly or healthily), the computer-implemented method 1300 can proceed to act 1316.

In various instances, act 1314 can include transmitting or rendering, by the scientific instrument (e.g., via 320 installed on 302), a notification indicating that the anomaly occurred but that the tuning operation can be trusted notwithstanding the anomaly.

In various instances, act 1316 can include transmitting or rendering, by the scientific instrument (e.g., via 320 installed on 302), a notification indicating that the anomaly was caused by damage or degradation to the constituent hardware, that the tuning operation cannot be trusted, and that maintenance of the constituent hardware is warranted.

Figure 16:
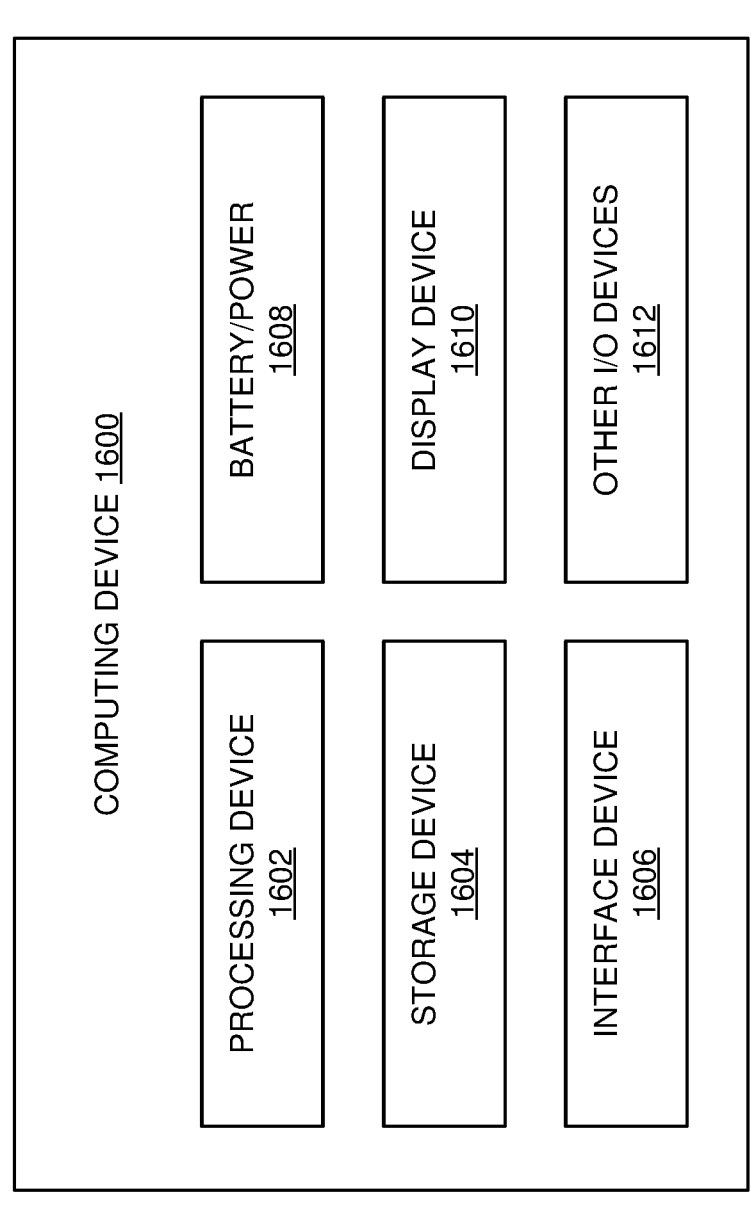
FIG. 16 illustrates an example, non-limiting block diagram of a computing device that can perform some or all of the methods or techniques disclosed herein, in accordance with various embodiments described herein.
Figure 17:
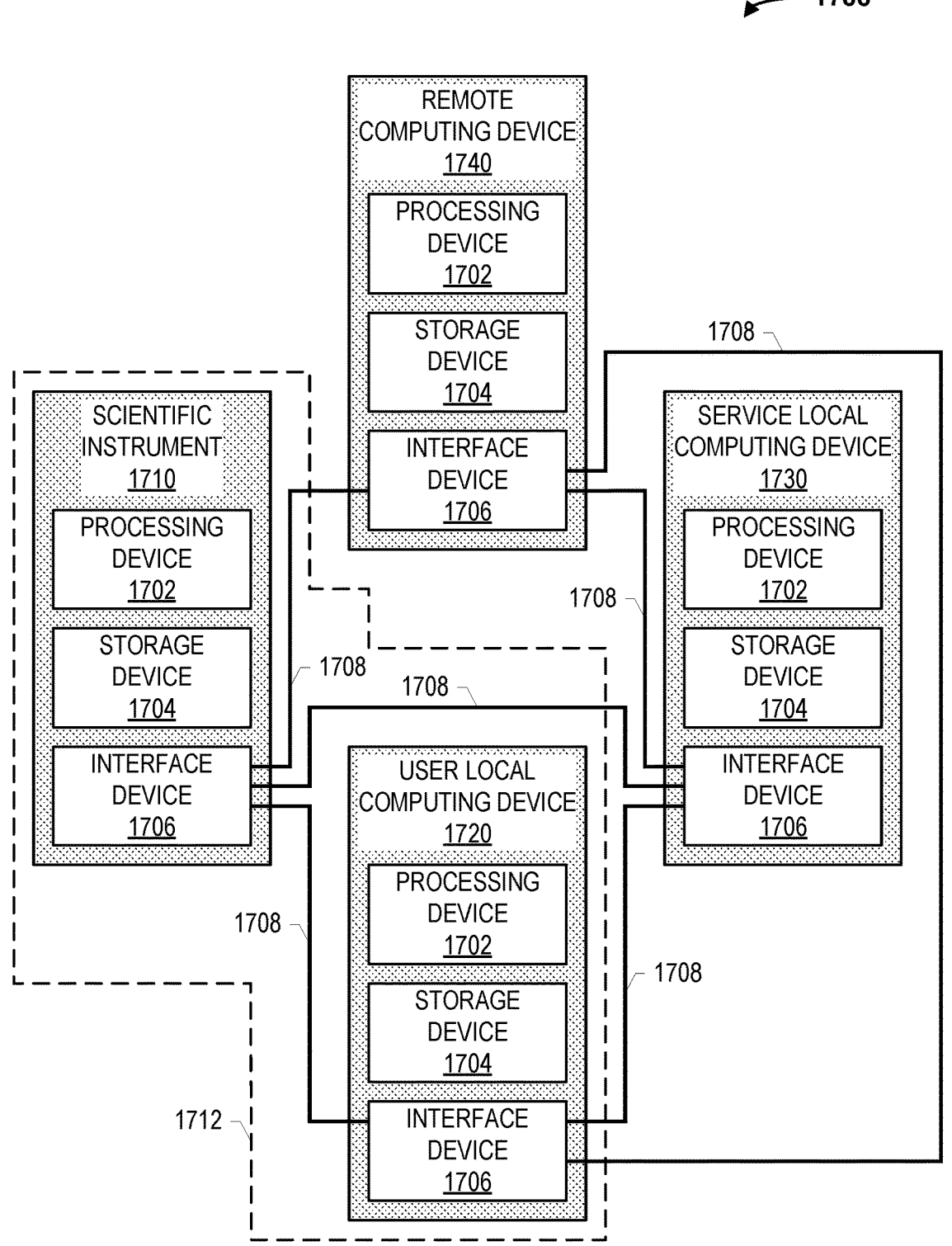
FIG. 17 illustrates an example, non-limiting block diagram of a scientific instrument support system in which some or all of the methods or techniques disclosed herein may be performed, in accordance with various embodiments described herein.

The scientific instrument systems, methods, or techniques disclosed herein may include interactions with a human user (e.g., via a user local computing device 1720 discussed herein with reference to FIG. 17). These interactions may include providing information to the user (e.g., information regarding the operation of a scientific instrument such as the scientific instrument 1710 of FIG. 17, information regarding a sample being analyzed or other test or measurement performed by a scientific instrument, information retrieved from a local or remote database, or other information) or providing an option for a user to input commands (e.g., to control the operation of a scientific instrument such as the scientific instrument 1710 of FIG. 17, or to control the analysis of data generated by a scientific instrument), queries (e.g., to a local or remote database), or other information. In some embodiments, these interactions may be performed through a graphical user interface (GUI) that includes a visual display on a display device (e.g., a display device 1610 discussed herein with reference to FIG. 16) that provides outputs to the user and/or prompts the user to provide inputs (e.g., via one or more input devices, such as a keyboard, mouse, trackpad, or touchscreen, included in other I/O devices 1612 discussed herein with reference to FIG. 16). The scientific instrument systems, methods, or techniques disclosed herein may include any suitable GUIs for interaction with a user.

Figure 15:
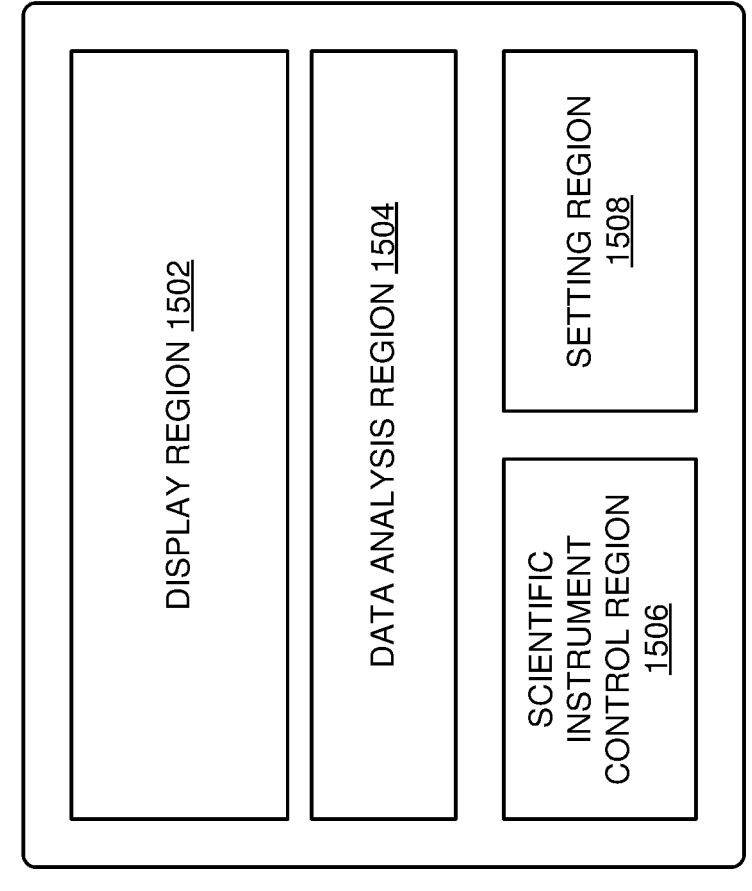
FIG. 15 illustrates an example, non-limiting block diagram of a graphical user interface that can be used in the performance of some or all of the methods or techniques disclosed herein, in accordance with various embodiments described herein.

FIG. 15 depicts an example graphical user interface 1500 (hereafter "GUI 1500") that can be used in the performance of some or all of the support methods or techniques disclosed herein, in accordance with various embodiments. In various aspects, the GUI 1500 can be provided on any suitable electronic display (e.g., a display device 1610 discussed herein with reference to FIG. 16) of a computing device (e.g., a computing device 1600 discussed herein with reference to FIG. 16) of a scientific instrument support system (e.g., a scientific instrument support system 1700 discussed herein with reference to FIG. 17), and a user or technician can interact with the GUI 1500 using any suitable input device (e.g., any of other I/O devices 1612 discussed herein with reference to FIG. 16) and input technique (e.g., movement of a cursor, motion capture, facial recognition, gesture detection, voice recognition, actuation of buttons).

The GUI 1500 can include a data display region 1502, a data analysis region 1504, a scientific instrument control region 1506, and a setting region 1508. The particular number and arrangement of regions depicted in FIG. 16 is merely illustrative, and any number and arrangement of regions, including any desired features, can be included in other embodiments of the GUI 1500.

The data display region 1502 can display data generated by a scientific instrument (e.g., a scientific instrument 1710 discussed herein with reference to FIG. 17). For example, the data display region 1502 can display any of the one or more measured ion spectra 604 or the diagnostic determination 606.

The data analysis region 1504 can display any suitable data analysis results (e.g., the results of analyzing the data illustrated in the data display region 1502 or other data). For example, the data analysis region 1504 can display any electronic notifications that are generated by the result component 320. In some embodiments, the data display region 1502 and the data analysis region 1504 can be combined in the GUI 1500 (e.g., to include both data output from a scientific instrument and some analysis of the data in a common graph or region).

The scientific instrument control region 1506 can include options that allow a user or technician to control a scientific instrument (e.g., the scientific instrument 1710 discussed herein with reference to FIG. 17). For example, the scientific instrument control region 1506 can include configurable parameters that govern operation of such scientific instrument (e.g., configurable parameters that govern voltages or currents of the scientific instrument, that govern interior temperatures of the scientific instrument, or that govern fluid flow rates of the scientific instrument).

The setting region 1508 can include options that allow a user or technician to control any features or functions of the GUI 1500 (or of other GUIs) or to perform common computing operations with respect to the data display region 1502 and the data analysis region 1504 (e.g., saving data on a storage device, such as the storage device 1604 discussed herein with reference to FIG. 16, sending data to another user, labeling data).

As noted above, the scientific instrument module 102 can be implemented by one or more computing devices. FIG. 16 is a block diagram of a computing device 1600 that can perform some or all of the scientific instrument methods or techniques disclosed herein, in accordance with various embodiments. In some embodiments, the scientific instrument module 102 can be implemented by a single instance of the computing device 1600 or by multiple instances of the computing device 1600. Further, as discussed below, the computing device 1600 (or multiple instances thereof) that implements the scientific instrument module 102 can be part of one or more of a scientific instrument 1710, a user local computing device 1720, a service local computing device 1730, or a remote computing device 1740 of FIG. 17.

The computing device 1600 is illustrated as having a number of components, but any one or more of these components can be omitted or duplicated, as suitable for the application and setting. In some embodiments, some or all of the components included in the computing device 1600 can be attached to one or more motherboards and enclosed in a housing (e.g., including plastic, metal, or other materials). In some embodiments, some these components can be fabricated onto a single system-on-a-chip (SoC) (e.g., an SoC may include one or more instances of a processing device 1602 and one or more instances of a storage device 1604). Additionally, in various embodiments, the computing device 1600 can omit one or more of the components illustrated in FIG. 16, but can include interface circuitry (not shown) for coupling to the one or more omitted components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 1600 can omit a display device 1610, but can include display device interface circuitry (e.g., a connector and driver circuitry) to which a display device 1610 can be coupled.

The computing device 1600 can include a processing device 1602 (e.g., one or more processing devices). As used herein, the term "processing device" can refer to any device or portion of a device that processes electronic data from registers or memory to transform that electronic data into other electronic data that may be stored in registers or memories. The processing device 1602 can include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 1600 can include a storage device 1604 (e.g., one or more storage devices). The storage device 1604 can include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 1604 can include memory that shares a die with a processing device 1602. In such an embodiment, the memory may be used as cache memory and may include embedded dynamic random access memory (eDRAM) or spin transfer torque magnetic random access memory (STT-MRAM), for example. In some embodiments, the storage device 1604 can include non-transitory computer readable media having instructions thereon that, when executed by one or more processing devices (e.g., the processing device 1602), cause the computing device 1600 to perform any appropriate ones of or portions of the methods disclosed herein.

The computing device 1600 can include an interface device 1606 (e.g., one or more instances of the interface device 1606). The interface device 1606 can include one or more communication chips, connectors, or other hardware and software to govern communications between the computing device 1600 and other computing devices. For example, the interface device 1606 can include circuitry for managing wireless communications for the transfer of data to and from the computing device 1600. The term "wireless" and its derivatives may be used to describe circuits, devices, systems, methods, techniques, or communications channels that may communicate data through the use of modulated electromagnetic radiation through a nonsolid medium. The term does not imply that the associated devices do not contain any wires, although in some embodiments they might not. Circuitry included in the interface device 1606 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2")). In some embodiments, circuitry included in the interface device 1606 for managing wireless communications can operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 1606 for managing wireless communications can operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 1606 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 1606 may include one or more antennas (e.g., one or more antenna arrays) to receipt and/or transmission of wireless communications.

In some embodiments, the interface device 1606 can include circuitry for managing wired communications, such as electrical, optical, or any other suitable communication protocols. For example, the interface device 1606 can include circuitry to support communications in accordance with Ethernet technologies. In some embodiments, the interface device 1606 can support both wireless and wired communication, or can support multiple wired communication protocols or multiple wireless communication protocols. For example, a first set of circuitry of the interface device 1606 may be dedicated to shorter-range wireless communications such as Wi-Fi or Bluetooth, and a second set of circuitry of the interface device 1606 may be dedicated to longer-range wireless communications such as global positioning system (GPS), EDGE, GPRS, CDMA, WiMAX, LTE, EV-DO, or others. In some embodiments, a first set of circuitry of the interface device 1606 can be dedicated to wireless communications, and a second set of circuitry of the interface device 1606 can be dedicated to wired communications.

The computing device 1600 can include battery/power circuitry 1608. The battery/power circuitry 1608 can include one or more energy storage devices (e.g., batteries or capacitors) or circuitry for coupling components of the computing device 1600 to an energy source separate from the computing device 1600 (e.g., alternating current line power).

The computing device 1600 can include a display device 1610 (e.g., multiple display devices). The display device 1610 can include any visual indicators, such as a heads-up display, a computer monitor, a projector, a touchscreen display, a liquid crystal display (LCD), a light-emitting diode display, or a flat panel display.

The computing device 1600 can include other input/output (I/O) devices 1612. The other I/O devices 1612 can include one or more audio output devices (e.g., speakers, headsets, earbuds, alarms), one or more audio input devices (e.g., microphones or microphone arrays), location devices (e.g., GPS devices in communication with a satellite-based system to receive a location of the computing device 1600), audio codecs, video codecs, printers, sensors (e.g., thermocouples or other temperature sensors, humidity sensors, pressure sensors, vibration sensors, accelerometers, gyroscopes), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 1600 can have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer), a desktop computing device, or a server computing device or other networked computing component.

One or more computing devices implementing any of the scientific instrument modules, methods, or techniques disclosed herein may be part of a scientific instrument support system. FIG. 17 is a block diagram of an example scientific instrument support system 1700 in which some or all of the scientific instrument support methods disclosed herein may be performed, in accordance with various embodiments. The scientific instrument modules, methods, or techniques disclosed herein (e.g., the scientific instrument module 102, the computer-implemented method 200, the diagnostic system 308, the computer-implemented method 700, the computer-implemented method 900, the computer-implemented method 1100, the computer-implemented method 1300) can be implemented by one or more of a scientific instrument 1710, a user local computing device 1720, a service local computing device 1730, or a remote computing device 1740 of the scientific instrument support system 1700.

Any of the scientific instrument 1710, the user local computing device 1720, the service local computing device 1730, or the remote computing device 1740 can include any of the embodiments of the computing device 1600, and any of the scientific instrument 1710, the user local computing device 1720, the service local computing device 1730, or the remote computing device 1740 can take the form of any appropriate ones of the embodiments of the computing device 1600.

The scientific instrument 1710, the user local computing device 1720, the service local computing device 1730, or the remote computing device 1740 may each include a processing device 1702, a storage device 1704, and an interface device 1706. The processing device 1702 may take any suitable form, including any form of the processing device 1602, and the processing devices 1702 included in different ones of the scientific instrument 1710, the user local computing device 1720, the service local computing device 1730, or the remote computing device 1740 may take the same form or different forms. The storage device 1704 may take any suitable form, including any form of the storage device 1604, and the storage devices 1704 included in different ones of the scientific instrument 1710, the user local computing device 1720, the service local computing device 1730, or the remote computing device 1740 may take the same form or different forms. The interface device 1706 may take any suitable form, including any form of the interface device 1606, and the interface devices 1706 included in different ones of the scientific instrument 1710, the user local computing device 1720, the service local computing device 1730, or the remote computing device 1740 may take the same form or different forms.

The scientific instrument 1710, the user local computing device 1720, the service local computing device 1730, and the remote computing device 1740 can be in communication with other elements of the scientific instrument support system 1700 via communication pathways 1708. The communication pathways 1708 may communicatively couple the interface devices 1706 of different ones of the elements of the scientific instrument support system 1700, as shown, and may be wired or wireless communication pathways (e.g., in accordance with any of the communication techniques discussed herein with reference to the interface device 1606). The particular scientific instrument support system 1700 depicted in FIG. 17 includes communication pathways between each pair of the scientific instrument 1710, the user local computing device 1720, the service local computing device 1730, and the remote computing device 1740, but this "fully connected" implementation is merely illustrative, and in various embodiments, various ones of the communication pathways 1708 may be absent. For example, in some embodiments, a service local computing device 1730 can lack a direct communication pathway 1708 between its interface device 1706 and the interface device 1706 of the scientific instrument 1710, but can instead communicate with the scientific instrument 1710 via the communication pathway 1708 between the service local computing device 1730 and the user local computing device 1720 and the communication pathway 1708 between the user local computing device 1720 and the scientific instrument 1710.

The scientific instrument 1710 may include any appropriate scientific instrument, such as the scientific instrument 302.

The user local computing device 1720 can be a computing device (e.g., in accordance with any of the embodiments of the computing device 1600) that is local to a user of the scientific instrument 1710. In some embodiments, the user local computing device 1720 may also be local to the scientific instrument 1710, but this need not be the case; for example, a user local computing device 1720 that is in a user's home or office may be remote from, but in communication with, the scientific instrument 1710 so that the user may use the user local computing device 1720 to control or access data from the scientific instrument 1710. In some embodiments, the user local computing device 1720 may be a laptop, smartphone, or tablet device. In some embodiments the user local computing device 1720 can be a portable computing device.

The service local computing device 1730 can be a computing device (e.g., in accordance with any of the embodiments of the computing device 1600) that is local to an entity that services the scientific instrument 1710. For example, the service local computing device 1730 may be local to a manufacturer of the scientific instrument 1710 or to a third-party service company. In some embodiments, the service local computing device 1730 can communicate with the scientific instrument 1710, the user local computing device 1720, or the remote computing device 1740 (e.g., via a direct communication pathway 1708 or via multiple "indirect" communication pathways 1708, as discussed above) to receive data regarding the operation of the scientific instrument 1710, the user local computing device 1720, or the remote computing device 1740 (e.g., the results of self-tests of the scientific instrument 1710, calibration coefficients used by the scientific instrument 1710, the measurements of sensors associated with the scientific instrument 1710). In some embodiments, the service local computing device 1730 may communicate with the scientific instrument 1710, the user local computing device 1720, or the remote computing device 1740 (e.g., via a direct communication pathway 1708 or via multiple "indirect" communication pathways 1708, as discussed above) to transmit data to the scientific instrument 1710, the user local computing device 1720, or the remote computing device 1740 (e.g., to update programmed instructions, such as firmware, in the scientific instrument 1710, to initiate the performance of test or calibration sequences in the scientific instrument 1710, to update programmed instructions, such as software, in the user local computing device 1720 or the remote computing device 1740). A user of the scientific instrument 1710 can utilize the scientific instrument 1710 or the user local computing device 1720 to communicate with the service local computing device 1730 to report a problem with the scientific instrument 1710 or the user local computing device 1720, to request a visit from a technician to improve the operation of the scientific instrument 1710, to order consumables or replacement parts associated with the scientific instrument 1710, or for other purposes.

The remote computing device 1740 can be a computing device (e.g., in accordance with any of the embodiments of the computing device 1600 discussed herein) that is remote from the scientific instrument 1710 or from the user local computing device 1720. In some embodiments, the remote computing device 1740 can be included in a datacenter or other large-scale server environment. In some embodiments, the remote computing device 1740 may include network-attached storage (e.g., as part of the storage device 1704). The remote computing device 1740 can store data generated by the scientific instrument 1710, perform analyses of the data generated by the scientific instrument 1710 (e.g., in accordance with programmed instructions), facilitate communication between the user local computing device 1720 and the scientific instrument 1710, or facilitate communication between the service local computing device 1730 and the scientific instrument 1710.

In some embodiments, one or more of the elements of the scientific instrument support system 1700 illustrated in FIG. 17 can be omitted. Further, in some embodiments, multiple ones of various ones of the elements of the scientific instrument support system 1700 of FIG. 17 may be present. For example, a scientific instrument support system 1700 can include multiple user local computing devices 1720 (e.g., different user local computing devices 1720 associated with different users or in different locations). In another example, a scientific instrument support system 1700 may include multiple scientific instruments 1710, all in communication with service local computing device 1730 and/or a remote computing device 1740; in such an embodiment, the service local computing device 1730 may monitor these multiple scientific instruments 1710, and the service local computing device 1730 may cause updates or other information may be "broadcast" to multiple scientific instruments 1710 at the same time. Different ones of the scientific instruments 1710 in a scientific instrument support system 1700 can be located close to one another (e.g., in the same room) or farther from one another (e.g., on different floors of a building, in different buildings, in different cities, etc.). In some embodiments, a scientific instrument 1710 can be connected to an Internet-of-Things (IoT) stack that allows for command and control of the scientific instrument 1710 through a web-based application, a virtual or augmented reality application, a mobile application, or a desktop application. Any of these applications can be accessed by a user operating the user local computing device 1720 in communication with the scientific instrument 1710 by the intervening remote computing device 1740. In some embodiments, a scientific instrument 1710 may be sold by the manufacturer along with one or more associated user local computing devices 1720 as part of a local scientific instrument computing unit 1712.

In some embodiments, different ones of the scientific instruments 1710 included in a scientific instrument support system 1700 may be different types of scientific instruments 1710; for example, one scientific instrument 1710 may be a mass spectrometer, while another scientific instrument 1710 may be a chromatograph. In some such embodiments, the remote computing device 1740 or the user local computing device 1720 can combine data from different types of scientific instruments 1710 included in a scientific instrument support system 1700.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=$confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 18:
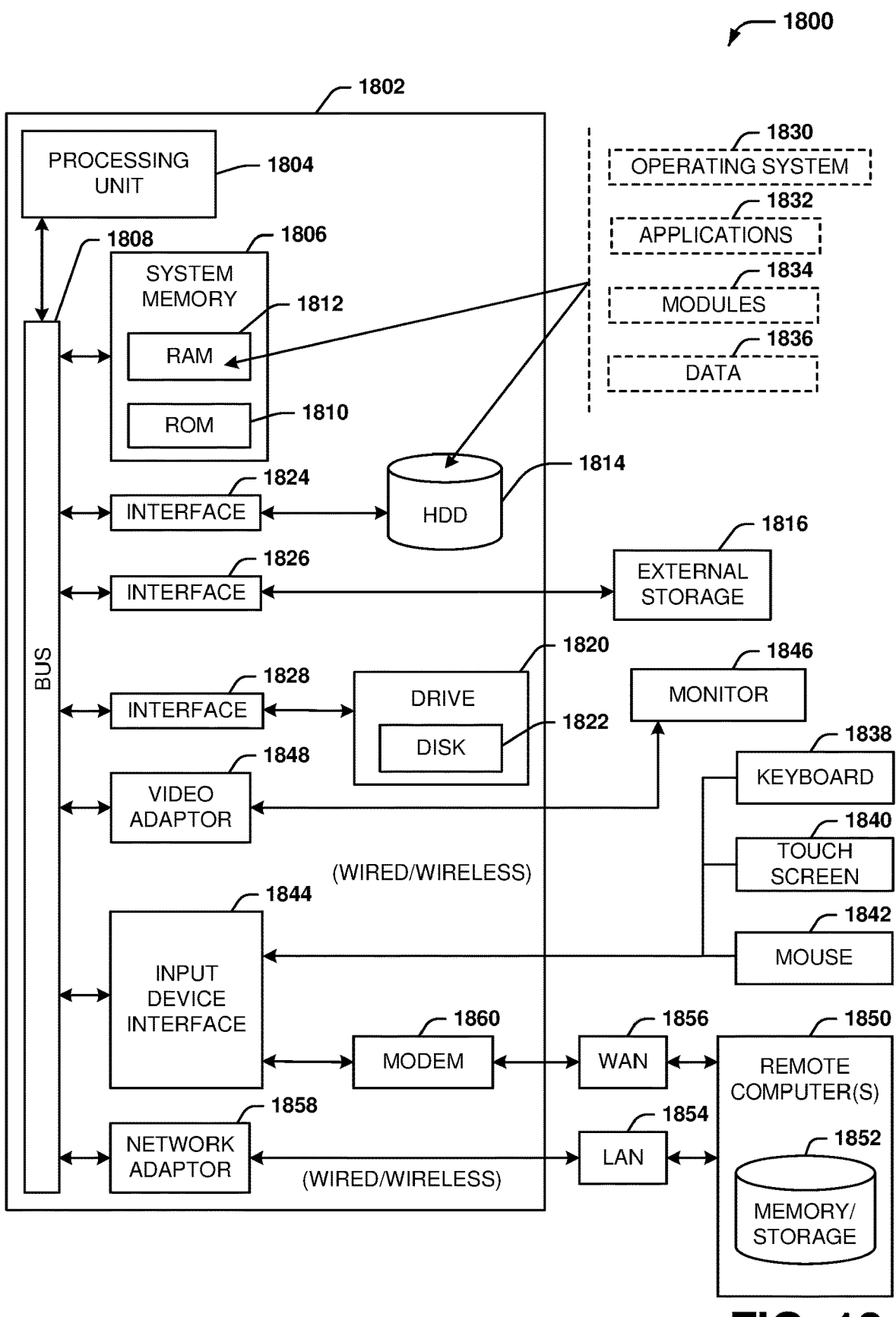
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 19 is a schematic block diagram of a sample computing environment 1900 with which the disclosed subject matter can interact. The sample computing environment 1900 includes one or more client(s) 1910. The client(s) 1910 can be hardware or software (e.g., threads, processes, computing devices). The sample computing environment 1900 also includes one or more server(s) 1930. The server(s) 1930 can also be hardware or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The sample computing environment 1900 includes a communication framework 1950 that can be employed to facilitate communications between the client(s) 1910 and the server(s) 1930. The client(s) 1910 are operably connected to one or more client data store(s) 1920 that can be employed to store information local to the client(s) 1910. Similarly, the server (s) 1930 are operably connected to one or more server data store(s) 1940 that can be employed to store information local to the servers 1930.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects are described in the following examples.

EXAMPLE 1: A scientific instrument can comprise a mass spectrometer coupled to a chromatograph and can comprise a processor that executes computer-executable components stored in a non-transitory computer-readable memory. In various aspects, the computer-executable components can comprise a determination component that can determine, via a temperature sensor of the chromatograph or via a clock of the mass spectrometer, whether the scientific instrument is in an idle-time period. In various instances, the computer-executable components can comprise a check component that, in response to a determination that the scientific instrument is in the idle-time period, can apply one or more electronic control signals to the mass spectrometer or to the chromatograph, can measure one or more resultant ion spectra via an ion detector of the mass spectrometer, and can determine whether the mass spectrometer or the chromatograph is operating correctly based on the one or more resultant ion spectra.

EXAMPLE 2: The scientific instrument of any preceding example can be implemented, wherein the applying the one or more electronic control signals can activate an ion beam emitter of the mass spectrometer, wherein the applying the one or more electronic control signals can be purported to cause an ion focusing lens of the mass spectrometer to shift from a pass state to a block state, wherein the one or more resultant ion spectra can indicate a first abundance of a first ion measured for the pass state, wherein the one or more resultant ion spectra can indicate a second abundance of the first ion measured for the block state, and wherein the first abundance differing from the second abundance by less than a threshold amount can indicate that the ion focusing lens is electrically disconnected.

EXAMPLE 3: The scientific instrument of any preceding example can be implemented, wherein the applying the one or more electronic control signals can cause an ion beam emitter of the mass spectrometer to charge an ion focusing lens of the mass spectrometer, wherein the one or more resultant ion spectra can indicate a first abundance of a first ion measured prior to such charging, wherein the one or more resultant ion spectra can indicate a second abundance of the first ion measured after such charging, and wherein the first abundance differing from the second abundance by more than a threshold amount can indicate that the ion focusing lens is contaminated with an ion burn.

EXAMPLE 4: The scientific instrument of any preceding example can be implemented, wherein the applying the one or more electronic control signals can deactivate an ion beam emitter of the mass spectrometer, wherein the one or more resultant ion spectra can indicate an abundance of a first ion measured after such deactivation, and wherein the abundance being above a threshold can indicate that the ion detector suffers from excessive background noise.

EXAMPLE 5: The scientific instrument of any preceding example can be implemented, wherein the applying the one or more electronic control signals can open a fluid valve of the chromatograph, wherein the one or more resultant ion spectra can indicate an abundance of a first ion measured after such opening, wherein the first ion can correspond to a fluid of the chromatograph, and wherein the abundance being above a threshold can indicate that there is a fluid leak between the chromatograph and the mass spectrometer.

EXAMPLE 6: The scientific instrument of any preceding example can be implemented, wherein the computer-executable components can comprise a result component that, in response to a determination that the mass spectrometer or the chromatograph is not operating correctly, can visually render on an electronic display of the scientific instrument a notification indicating that maintenance is warranted.

EXAMPLE 7: The scientific instrument of any preceding example can be implemented, wherein the computer-executable components can comprise a result component that, in response to a determination that the mass spectrometer or the chromatograph is not operating correctly, can visually render on an electronic display of the scientific instrument a notification indicating that a tuning operation previously performed on the mass spectrometer or on the chromatograph was not successful.

In various aspects, any combination or combinations of EXAMPLES 1-7 can be implemented.

EXAMPLE 8: A computer-implemented method can comprise determining, by a scientific instrument comprising a mass spectrometer coupled to a chromatograph, whether the scientific instrument is in an idle-time period, based on a temperature sensor of the chromatograph or based on a clock of the mass spectrometer. In various aspects, the computer-implemented method can comprise executing, by the scientific instrument and based at least in part on a determination that the scientific instrument is in the idle-time period, a diagnostic check on the mass spectrometer or on the chromatograph.

EXAMPLE 9: The computer-implemented method of any preceding example can be implemented, wherein the diagnostic check can be a lens connection check, a voltage or current readback check, an ion optics charging check, a fluid leak check, a filament control check, a background noise check, an ion fragmentation check, an electrospray stability check, a calibrant solution check, an ion transfer tube check, a polarity switching check or a communication check.

EXAMPLE 10: The computer-implemented method of any preceding example can be implemented, further comprising executing, by the scientific instrument and in response to the determination that the scientific instrument is in the idle-time period, a tuning operation on the mass spectrometer or on the chromatograph, wherein the diagnostic check can be executed in response to completion of the tuning operation.

EXAMPLE 11: The computer-implemented method of any preceding example can be implemented, further comprising visually rendering, by the scientific instrument, in response to the diagnostic check indicating that the mass spectrometer or the chromatograph has failed to operate within a threshold tolerance, and on an electronic display of the scientific instrument, a notification indicating that the tuning operation was not successful.

EXAMPLE 12: The computer-implemented method of any preceding example can be implemented, further comprising executing, by the scientific instrument and in response to the determination that the scientific instrument is in the idle-time period, a tuning operation on the mass spectrometer or on the chromatograph, wherein the diagnostic check can be executed in response to an anomaly encountered during the tuning operation.

EXAMPLE 13: The computer-implemented method of any preceding example can be implemented, further comprising visually rendering, by the scientific instrument, in response to the diagnostic check indicating that constituent hardware of the mass spectrometer or of the chromatograph has failed to operate within a threshold tolerance, and on an electronic display of the scientific instrument, a notification indicating that damage to the constituent hardware is responsible for the anomaly.

EXAMPLE 14: The computer-implemented method of any preceding example can be implemented, wherein the diagnostic check can be performed in response to the determination that the scientific instrument is in the idle-time period, and further comprising executing, by the scientific instrument and in response to the diagnostic check indicating that constituent hardware of the mass spectrometer or of the chromatograph has failed to operate within a threshold tolerance, a tuning operation on the constituent hardware.

EXAMPLE 15: The computer-implemented method of any preceding example can be implemented, further comprising rendering, by the scientific instrument, in response to the diagnostic check indicating that constituent hardware of the mass spectrometer or of the chromatograph has failed to operate within a threshold tolerance, and on an electronic display of the scientific instrument, a notification indicating that maintenance of the constituent hardware is warranted.

In various aspects, any combination or combinations of EXAMPLES 8-15 can be implemented.

EXAMPLE 16: A computer program product for facilitating idle-triggered diagnostics for scientific instruments can be implemented. In various aspects, the computer program product can comprise a non-transitory computer-readable memory having program instructions embodied therewith. In various instances, the program instructions can be executable by a processor to cause the processor to: measure a temperature of a chromatograph that is coupled to a mass spectrometer; execute, in response to a determination that the temperature indicates an idle-time period of the mass spectrometer, a tuning operation on the mass spectrometer; and verify whether the tuning operation was successful, by executing, during the idle-time period and after the tuning operation, a diagnostic check on the mass spectrometer, wherein the diagnostic check can involve measuring an ion spectrum via an ion detector of the mass spectrometer and comparing the ion spectrum to a threshold.

EXAMPLE 17: The computer program product of any preceding example can be implemented, wherein the diagnostic check can be a lens connection check or an ion optics charging check.

EXAMPLE 18: The computer program product of any preceding example can be implemented, wherein the chromatograph can be a gas chromatograph or a liquid chromatograph.

EXAMPLE 19: The computer program product of any preceding example can be implemented, wherein the program instructions are further executable to cause the processor to identify, in response to the ion spectrum failing to satisfy the threshold, a maintenance task corresponding to the diagnostic check.

EXAMPLE 20: The computer program product of any preceding example can be implemented, wherein the program instructions are further executable to cause the processor to schedule performance of the maintenance task.

In various aspects, any combination or combinations of EXAMPLES 16-20 can be implemented.

In various aspects, any combination or combinations of EXAMPLES 1-20 can be implemented.

What is claimed is:
1. A scientific instrument, comprising:
a mass spectrometer coupled to a chromatograph; and

a processor that executes computer-executable components stored in a non-transitory computer-readable memory, wherein the computer-executable components comprise:
a determination component that determines, via a temperature sensor of the chromatograph or via a clock of the mass spectrometer, whether the scientific instrument is in an idle-time period; and
a check component that, in response to a determination that the scientific instrument is in the idle-time period, applies one or more electronic control signals to the mass spectrometer or to the chromatograph, measures one or more resultant ion spectra via an ion detector of the mass spectrometer, and determines whether the mass spectrometer or the chromatograph is operating correctly based on the one or more resultant ion spectra.

2. The scientific instrument of claim 1, wherein the applying the one or more electronic control signals activates an ion beam emitter of the mass spectrometer, wherein the applying the one or more electronic control signals is purported to cause an ion focusing lens of the mass spectrometer to shift from a pass state to a block state, wherein the one or more resultant ion spectra indicate a first abundance of a first ion measured for the pass state, wherein the one or more resultant ion spectra indicate a second abundance of the first ion measured for the block state, and wherein the first abundance differing from the second abundance by less than a threshold amount indicates that the ion focusing lens is electrically disconnected.

3. The scientific instrument of claim 1, wherein the applying the one or more electronic control signals causes an ion beam emitter of the mass spectrometer to charge an ion focusing lens of the mass spectrometer, wherein the one or more resultant ion spectra indicate a first abundance of a first ion measured prior to such charging, wherein the one or more resultant ion spectra indicate a second abundance of the first ion measured after such charging, and wherein the first abundance differing from the second abundance by more than a threshold amount indicates that the ion focusing lens is contaminated with an ion burn.

4. The scientific instrument of claim 1, wherein the applying the one or more electronic control signals deactivates an ion beam emitter of the mass spectrometer, wherein the one or more resultant ion spectra indicate an abundance of a first ion measured after such deactivation, and wherein the abundance being above a threshold indicates that the ion detector suffers from excessive background noise.

5. The scientific instrument of claim 1, wherein the applying the one or more electronic control signals opens a fluid valve of the chromatograph, wherein the one or more resultant ion spectra indicate an abundance of a first ion measured after such opening, wherein the first ion corresponds to a fluid of the chromatograph, and wherein the abundance being above a threshold indicates that there is a fluid leak between the chromatograph and the mass spectrometer.

6. The scientific instrument of claim 1, wherein the computer-executable components comprise:
a result component that, in response to a determination that the mass spectrometer or the chromatograph is not operating correctly, visually renders on an electronic display of the scientific instrument a notification indicating that maintenance is warranted.

7. The scientific instrument of claim 1, wherein the computer-executable components comprise:

a result component that, in response to a determination that the mass spectrometer or the chromatograph is not operating correctly, visually renders on an electronic display of the scientific instrument a notification indicating that a tuning operation previously performed on the mass spectrometer or on the chromatograph was not successful.

8. A computer-implemented method, comprising:

determining, by a scientific instrument comprising a mass spectrometer coupled to a chromatograph, whether the scientific instrument is in an idle-time period, based on a temperature sensor of the chromatograph or based on a clock of the mass spectrometer; and executing, by the scientific instrument and based at least in part on a determination that the scientific instrument is in the idle-time period, a diagnostic check on the mass spectrometer or on the chromatograph.

9. The computer-implemented method of claim 8, wherein the diagnostic check is a lens connection check, a voltage or current readback check, an ion optics charging check, a fluid leak check, a filament control check, a background noise check, an ion fragmentation check, an electrospray stability check, a calibrant solution check, an ion transfer tube check, a polarity switching check or a communication check.

10. The computer-implemented method of claim 8, further comprising:

executing, by the scientific instrument and in response to the determination that the scientific instrument is in the idle-time period, a tuning operation on the mass spectrometer or on the chromatograph, wherein the diagnostic check is executed in response to completion of the tuning operation.

11. The computer-implemented method of claim 10, further comprising:

visually rendering, by the scientific instrument, in response to the diagnostic check indicating that the mass spectrometer or the chromatograph has failed to operate within a threshold tolerance, and on an electronic display of the scientific instrument, a notification indicating that the tuning operation was not successful.

12. The computer-implemented method of claim 8, further comprising:

executing, by the scientific instrument and in response to the determination that the scientific instrument is in the idle-time period, a tuning operation on the mass spectrometer or on the chromatograph, wherein the diagnostic check is executed in response to an anomaly encountered during the tuning operation.

13. The computer-implemented method of claim 12, further comprising:

visually rendering, by the scientific instrument, in response to the diagnostic check indicating that constituent hardware of the mass spectrometer or of the chromatograph has failed to operate within a threshold tolerance, and on an electronic display of the scientific instrument, a notification indicating that damage to the constituent hardware is responsible for the anomaly.

14. The computer-implemented method of claim 8, wherein the diagnostic check is performed in response to the determination that the scientific instrument is in the idle-time period, and further comprising:

executing, by the scientific instrument and in response to the diagnostic check indicating that constituent hardware of the mass spectrometer or of the chromatograph has failed to operate within a threshold tolerance, a tuning operation on the constituent hardware.

15. The computer-implemented method of claim 8, further comprising:

rendering, by the scientific instrument, in response to the diagnostic check indicating that constituent hardware of the mass spectrometer or of the chromatograph has failed to operate within a threshold tolerance, and on an electronic display of the scientific instrument, a notification indicating that maintenance of the constituent hardware is warranted.

16. A computer program product for facilitating idle-triggered diagnostics for scientific instruments, the computer program product comprising a non-transitory computer-readable memory having program instructions embodied therewith, the program instructions executable by a processor to cause the processor to:

measure a temperature of a chromatograph that is coupled to a mass spectrometer;

execute, in response to a determination that the temperature indicates an idle-time period of the mass spectrometer, a tuning operation on the mass spectrometer; and verify whether the tuning operation was successful, by executing, during the idle-time period and after the tuning operation, a diagnostic check on the mass spectrometer, wherein the diagnostic check involves measuring an ion spectrum via an ion detector of the mass spectrometer and comparing the ion spectrum to a threshold.

17. The computer program product of claim 16, wherein the diagnostic check is a lens connection check or an ion optics charging check.

18. The computer program product of claim 16, wherein the chromatograph is a gas chromatograph or a liquid chromatograph.

19. The computer program product of claim 16, wherein the program instructions are further executable to cause the processor to:

identify, in response to the ion spectrum failing to satisfy the threshold, a maintenance task corresponding to the diagnostic check.

20. The computer program product of claim 19, wherein the program instructions are further executable to cause the processor to:

schedule performance of the maintenance task.

* * * * *